(12) United States Patent
Gallagher et al.

(10) Patent No.: US 7,843,900 B2
(45) Date of Patent: Nov. 30, 2010

(54) MECHANISMS TO EXTEND UMA OR GAN TO INTER-WORK WITH UMTS CORE NETWORK

(75) Inventors: Michael D. Gallagher, San Jose, CA (US); Milan Markovic, Pleasanton, CA (US)

(73) Assignee: Kineto Wireless, Inc., Milpitas, CA (US)

(*) Notice: Subject to any disclaimer, the term of this patent is extended or adjusted under 35 U.S.C. 154(b) by 1444 days.

(21) Appl. No.: 11/200,736

(22) Filed: Aug. 10, 2005

(65) Prior Publication Data

US 2007/0041360 A1    Feb. 22, 2007

(51) Int. Cl.
H04L 12/66    (2006.01)
H04W 4/00    (2009.01)

(52) U.S. Cl. .................................. 370/352; 370/338
(58) Field of Classification Search .............. 455/414.1, 455/456.2, 436, 435.2; 370/338, 352
See application file for complete search history.

(56) References Cited

U.S. PATENT DOCUMENTS

| | | |
|---|---|---|
| 5,014,197 A | 5/1991 | Wolf |
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellineig et al. |
| 5,267,261 A | 11/1993 | Blakeney, II et al. |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |

(Continued)

FOREIGN PATENT DOCUMENTS

EP    0936777 A1    8/1999

(Continued)

OTHER PUBLICATIONS

U.S. Appl. No. 10/116,023, filed Apr. 2, 2002, Mohammed, Jahangir, Non-Final Office Action of related case mailed: Apr. 13, 2006.

(Continued)

*Primary Examiner*—Charles N Appiah
*Assistant Examiner*—Kiet Doan
(74) *Attorney, Agent, or Firm*—Adeli & Tollen LLP

(57) ABSTRACT

Mechanisms to extend UMA (Unlicensed Mobile Access) or GAN (General Access Network) to inter-work with a UMTS (Universal Mobile Telecommunications System) core network. A UMA network controller (UNC) is provided to interface between a UMA network and a UMTS core network using the standard Iu-CS and Iu-PS interfaces. From the viewpoint of the UMTS core network, the UNC appears as another Radio Network Controller (RNC). Protocol layer schemes are disclosed for mobile stations, UNCs, SGSNs and MSCs to support signaling and data messaging in both the packet-switched and connection-switched domains. The mobile stations provide dual-mode operation, such that they are able to access the UMTS core network via unlicensed service when in a UMA access area, and to access the UMTS core network via licensed service when outside of a UMA access area and in a UTRAN service area.

19 Claims, 12 Drawing Sheets

U.S. PATENT DOCUMENTS

| | | | |
|---|---|---|---|
| 5,428,601 A | 6/1995 | Owen | |
| 5,442,680 A | 8/1995 | Schellinger et al. | |
| 5,448,619 A | 9/1995 | Evans et al. | |
| 5,507,035 A | 4/1996 | Bantz et al. | |
| 5,533,027 A | 7/1996 | Akerberg et al. | |
| 5,594,782 A | 1/1997 | Zicker et al. | |
| 5,610,969 A | 3/1997 | McHenry | |
| 5,634,193 A | 5/1997 | Ghisler | |
| 5,640,414 A | 6/1997 | Blakeney, II et al. | |
| 5,659,598 A | 8/1997 | Byrne | |
| 5,659,878 A | 8/1997 | Uchida et al. | |
| 5,664,005 A | 9/1997 | Emery et al. | |
| 5,673,307 A | 9/1997 | Holland et al. | |
| 5,675,629 A | 10/1997 | Raffel et al. | |
| 5,724,658 A | 3/1998 | Hasan | |
| 5,732,076 A | 3/1998 | Ketseoglou et al. | |
| 5,745,852 A | 4/1998 | Khan et al. | |
| 5,758,281 A | 5/1998 | Emery et al. | |
| 5,796,727 A | 8/1998 | Harrison et al. | |
| 5,796,729 A | 8/1998 | Greaney et al. | |
| 5,815,525 A | 9/1998 | Smith | |
| 5,818,820 A | 10/1998 | Anderson et al. | |
| 5,822,681 A | 10/1998 | Chang et al. | |
| 5,822,767 A | 10/1998 | MacWilliams et al. | |
| 5,825,759 A | 10/1998 | Liu | |
| 5,852,767 A | 12/1998 | Sugita | |
| 5,870,677 A | 2/1999 | Takahashi et al. | |
| 5,887,020 A | 3/1999 | Smith et al. | |
| 5,887,260 A | 3/1999 | Nakata | |
| 5,890,055 A | 3/1999 | Chu et al. | |
| 5,890,064 A | 3/1999 | Widergen et al. | |
| 5,903,834 A | 5/1999 | Wallstedt et al. | |
| 5,915,224 A | 6/1999 | Jonsson | |
| 5,926,760 A | 7/1999 | Khan et al. | |
| 5,936,949 A | 8/1999 | Pasternak et al. | |
| 5,940,512 A | 8/1999 | Tomoike | |
| 5,946,622 A | 8/1999 | Bojeryd | |
| 5,949,773 A | 9/1999 | Bhalla et al. | |
| 5,960,341 A | 9/1999 | LeBlanc et al. | |
| 5,995,828 A | 11/1999 | Nishida | |
| 6,016,318 A | 1/2000 | Tomoike | |
| 6,035,193 A | 3/2000 | Buhrmann et al. | |
| 6,052,592 A | 4/2000 | Schellinger et al. | |
| 6,101,176 A | 8/2000 | Honkasalo | |
| 6,112,080 A | 8/2000 | Anderson et al. | |
| 6,112,088 A | 8/2000 | Haartsen | |
| 6,119,000 A | 9/2000 | Stephenson et al. | |
| 6,130,886 A | 10/2000 | Ketseoglou et al. | |
| 6,134,227 A | 10/2000 | Magana | |
| 6,138,019 A | 10/2000 | Trompower et al. | |
| 6,167,279 A | 12/2000 | Chang et al. | |
| 6,226,515 B1 | 5/2001 | Pauli | |
| 6,236,852 B1 | 5/2001 | Veerasamy et al. | |
| 6,243,581 B1 | 6/2001 | Jawanda | |
| 6,256,511 B1 | 7/2001 | Brown | |
| 6,263,211 B1 | 7/2001 | Brunner | |
| 6,269,086 B1 | 7/2001 | Magana et al. | |
| 6,320,873 B1 | 11/2001 | Nevo et al. | |
| 6,327,470 B1 | 12/2001 | Ostling | |
| 6,359,872 B1 | 3/2002 | Mahany et al. | |
| 6,374,102 B1 | 4/2002 | Brachman et al. | |
| 6,381,457 B1 | 4/2002 | Carlsson et al. | |
| 6,389,059 B1 | 5/2002 | Smith et al. | |
| 6,393,007 B1 | 5/2002 | Haartsen | |
| 6,415,158 B1 | 7/2002 | King et al. | |
| 6,430,395 B2 | 8/2002 | Arazi et al. | |
| 6,434,389 B1 | 8/2002 | Meskanen et al. | |
| 6,445,921 B1 | 9/2002 | Bell | |
| 6,463,307 B1 | 10/2002 | Larsson et al. | |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,574,266 B1 | 6/2003 | Haartsen | |
| 6,587,444 B1 | 7/2003 | Lenzo et al. | |
| 6,633,761 B1 | 10/2003 | Singhal | |
| 6,643,512 B1 | 11/2003 | Ramaswamy | |
| 6,647,426 B1 | 11/2003 | Mohammed | |
| 6,658,250 B1 | 12/2003 | Ganesan et al. | |
| 6,665,276 B1 | 12/2003 | Culbertson et al. | |
| 6,675,009 B1 | 1/2004 | Cook | |
| 6,680,923 B1 | 1/2004 | Leon | |
| 6,711,400 B1 | 3/2004 | Aura | |
| 6,766,160 B1 | 7/2004 | Lemilainen | |
| 6,785,535 B2 | 8/2004 | Lucidarme et al. | |
| 6,788,656 B1 | 9/2004 | Smolentzov et al. | |
| 6,801,519 B1 | 10/2004 | Mangel | |
| 6,801,772 B1 | 10/2004 | Townend et al. | |
| 6,801,777 B2 | 10/2004 | Rusch | |
| 6,807,417 B2 | 10/2004 | Sallinen | |
| 6,823,154 B2 | 11/2004 | Koga et al. | |
| 6,824,048 B1 | 11/2004 | Itabashi et al. | |
| 6,826,154 B2 | 11/2004 | Subbiah et al. | |
| 6,829,227 B1 | 12/2004 | Pitt | |
| 6,842,462 B1 | 1/2005 | Ramjee et al. | |
| 6,842,621 B2 | 1/2005 | Labun et al. | |
| 6,845,095 B2 | 1/2005 | Krishnarajah et al. | |
| 6,850,503 B2 | 2/2005 | Dorenbosch et al. | |
| 6,853,851 B1 | 2/2005 | Rautiola et al. | |
| 6,895,255 B1 | 5/2005 | Bridgelall | |
| 6,909,705 B1 | 6/2005 | Lee et al. | |
| 6,922,559 B2 | 7/2005 | Mohammed | |
| 6,925,074 B1 | 8/2005 | Vikberg et al. | |
| 6,937,862 B2 | 8/2005 | Back et al. | |
| 6,970,719 B1 | 11/2005 | McConnell et al. | |
| 6,993,359 B1 | 1/2006 | Nelakanti | |
| 7,009,952 B1 | 3/2006 | Razavilar et al. | |
| 7,028,186 B1 | 4/2006 | Stenman et al. | |
| 7,039,025 B1 | 5/2006 | Menon et al. | |
| 7,065,353 B1 | 6/2006 | Bolinth et al. | |
| 7,069,022 B2 | 6/2006 | Rajaniemi et al. | |
| 7,099,339 B1 | 8/2006 | Wang et al. | |
| 7,107,055 B2 | 9/2006 | Gallagher et al. | |
| 7,127,250 B2 | 10/2006 | Gallagher et al. | |
| 7,171,205 B2 | 1/2007 | Gallagher et al. | |
| 7,197,309 B2 | 3/2007 | Gallagher et al. | |
| 7,200,112 B2 | 4/2007 | Sundar et al. | |
| 7,200,383 B2 | 4/2007 | Eronen | |
| 7,200,399 B2 | 4/2007 | Gallagher et al. | |
| 7,209,744 B2 | 4/2007 | Gallagher et al. | |
| 7,212,819 B2 | 5/2007 | Gallagher et al. | |
| 7,215,961 B2 | 5/2007 | Gallagher et al. | |
| 7,245,916 B2 | 7/2007 | Gallagher et al. | |
| 7,251,227 B2 | 7/2007 | de Jong et al. | |
| 7,272,397 B2 | 9/2007 | Gallagher et al. | |
| 7,283,821 B2 | 10/2007 | Gallagher et al. | |
| 7,283,822 B2 | 10/2007 | Gallagher et al. | |
| 7,308,263 B2 | 12/2007 | Gallagher et al. | |
| 7,324,818 B2 | 1/2008 | Gallagher et al. | |
| 7,349,698 B2 | 3/2008 | Gallagher et al. | |
| 7,369,854 B2 | 5/2008 | Gallagher et al. | |
| 7,369,859 B2 | 5/2008 | Gallagher | |
| 7,454,207 B2 | 11/2008 | Gallagher et al. | |
| 7,640,008 B2 | 12/2009 | Gallagher et al. | |
| 2001/0029186 A1 | 10/2001 | Canyon et al. | |
| 2001/0031645 A1 | 10/2001 | Jarrett | |
| 2001/0046860 A1 | 11/2001 | Lee | |
| 2001/0049790 A1 | 12/2001 | Faccin et al. | |
| 2002/0032030 A1 | 3/2002 | Berglund et al. | |
| 2002/0045459 A1 | 4/2002 | Morikawa | |
| 2002/0059516 A1 | 5/2002 | Turtiainen et al. | |
| 2002/0065099 A1 | 5/2002 | Bjorndahl | |

| | | | | | | |
|---|---|---|---|---|---|---|
| 2002/0066036 A1 | 5/2002 | Makineni | | 2005/0101245 A1 | 5/2005 | Ahmavaara |
| 2002/0075844 A1 | 6/2002 | Hagen | | 2005/0101329 A1 | 5/2005 | Gallagher |
| 2002/0080797 A1 | 6/2002 | Kim | | 2005/0111409 A1 | 5/2005 | Spear et al. |
| 2002/0082015 A1 | 6/2002 | Wu | | 2005/0130659 A1 | 6/2005 | Grech et al. |
| 2002/0085516 A1 | 7/2002 | Bridgelall | | 2005/0144647 A1 | 6/2005 | Zussman et al. |
| 2002/0101848 A1 | 8/2002 | Lee et al. | | 2005/0181805 A1 | 8/2005 | Gallagher |
| 2002/0102974 A1 | 8/2002 | Raith | | 2005/0186948 A1* | 8/2005 | Gallagher et al. ........ 455/414.1 |
| 2002/0118674 A1 | 8/2002 | Faccin et al. | | 2005/0198199 A1 | 9/2005 | Dowling |
| 2002/0131387 A1 | 9/2002 | Pitcher et al. | | 2005/0198306 A1 | 9/2005 | Palojarvi et al. |
| 2002/0132630 A1 | 9/2002 | Arazi et al. | | 2005/0207395 A1 | 9/2005 | Mohammed |
| 2002/0142761 A1 | 10/2002 | Wallstedt et al. | | 2005/0239441 A1 | 10/2005 | Eronen |
| 2002/0147008 A1 | 10/2002 | Kallio | | 2005/0250522 A1 | 11/2005 | Gilbert |
| 2002/0147016 A1 | 10/2002 | Arazi et al. | | 2005/0255879 A1 | 11/2005 | Shi |
| 2002/0155829 A1 | 10/2002 | Proctor, Jr. et al. | | 2005/0265279 A1 | 12/2005 | Markovic |
| 2002/0160811 A1 | 10/2002 | Jannette et al. | | 2005/0266853 A1 | 12/2005 | Gallagher |
| 2002/0161905 A1 | 10/2002 | Haverinen et al. | | 2005/0271008 A1 | 12/2005 | Gallagher |
| 2002/0166068 A1 | 11/2002 | Kilgore | | 2005/0272424 A1 | 12/2005 | Gallagher |
| 2002/0174335 A1 | 11/2002 | Zhang et al. | | 2005/0272425 A1 | 12/2005 | Amerga et al. |
| 2002/0191556 A1 | 12/2002 | Krishnarajah et al. | | 2005/0272449 A1 | 12/2005 | Gallagher |
| 2002/0191575 A1 | 12/2002 | Kalavade et al. | | 2006/0009201 A1 | 1/2006 | Gallagher |
| 2002/0197984 A1 | 12/2002 | Monin et al. | | 2006/0009202 A1 | 1/2006 | Gallagher |
| 2003/0007475 A1 | 1/2003 | Tsuda et al. | | 2006/0019656 A1 | 1/2006 | Gallagher |
| 2003/0026269 A1 | 2/2003 | Paryani | | 2006/0019657 A1 | 1/2006 | Gallagher |
| 2003/0031151 A1 | 2/2003 | Sharma et al. | | 2006/0019658 A1 | 1/2006 | Gallagher |
| 2003/0043773 A1 | 3/2003 | Chang | | 2006/0019667 A1 | 1/2006 | Hicks, III |
| 2003/0058816 A1 | 3/2003 | Shearer | | 2006/0025143 A1 | 2/2006 | Gallagher |
| 2003/0087653 A1 | 5/2003 | Leung | | 2006/0025144 A1 | 2/2006 | Gallagher |
| 2003/0112789 A1 | 6/2003 | Heinonen | | 2006/0025145 A1 | 2/2006 | Gallagher |
| 2003/0119480 A1 | 6/2003 | Mohammed | | 2006/0025146 A1 | 2/2006 | Gallagher |
| 2003/0119490 A1 | 6/2003 | Mohammed | | 2006/0025147 A1 | 2/2006 | Gallagher |
| 2003/0119527 A1 | 6/2003 | Labun | | 2006/0079258 A1 | 4/2006 | Gallagher |
| 2003/0119548 A1 | 6/2003 | Mohammed | | 2006/0079259 A1 | 4/2006 | Gallagher |
| 2003/0130008 A1 | 7/2003 | Rajaniemi et al. | | 2006/0079273 A1 | 4/2006 | Gallagher |
| 2003/0139180 A1 | 7/2003 | McIntosh et al. | | 2006/0079274 A1 | 4/2006 | Gallagher |
| 2003/0142673 A1 | 7/2003 | Patil | | 2006/0094431 A1 | 5/2006 | Saifullah et al. |
| 2003/0172264 A1 | 9/2003 | Dillon | | 2006/0098598 A1 | 5/2006 | Gallagher |
| 2003/0176186 A1 | 9/2003 | Mohammed | | 2006/0099935 A1 | 5/2006 | Gallagher et al. |
| 2003/0193952 A1 | 10/2003 | O'Neill | | 2006/0111113 A1 | 5/2006 | Waris |
| 2003/0210199 A1 | 11/2003 | Sward et al. | | 2006/0114871 A1 | 6/2006 | Buckley et al. |
| 2003/0217132 A1 | 11/2003 | Batten et al. | | 2006/0116125 A1 | 6/2006 | Buckley et al. |
| 2003/0219022 A1 | 11/2003 | Dillon et al. | | 2006/0146803 A1 | 7/2006 | Bae et al. |
| 2003/0219024 A1 | 11/2003 | Purnadai et al. | | 2006/0183482 A1 | 8/2006 | Ueda |
| 2003/0224820 A1 | 12/2003 | Einola et al. | | 2006/0223532 A1 | 10/2006 | Liu et al. |
| 2003/0235186 A1 | 12/2003 | Park | | 2006/0239277 A1 | 10/2006 | Gallagher et al. |
| 2004/0008649 A1 | 1/2004 | Wybenga | | 2006/0268845 A1 | 11/2006 | He et al. |
| 2004/0009749 A1 | 1/2004 | Arazi et al. | | 2006/0286981 A1 | 12/2006 | Summaki et al. |
| 2004/0013099 A1 | 1/2004 | O'Neill | | 2006/0291455 A1 | 12/2006 | Katz et al. |
| 2004/0025018 A1 | 2/2004 | Haas | | 2007/0053370 A1 | 3/2007 | Aghvami et al. |
| 2004/0037312 A1 | 2/2004 | Spear | | 2007/0183421 A1 | 8/2007 | Terrell et al. |
| 2004/0053623 A1 | 3/2004 | Hoff et al. | | 2007/0268855 A1 | 11/2007 | Grayson et al. |
| 2004/0063451 A1 | 4/2004 | Bonta et al. | | 2007/0286132 A1* | 12/2007 | Vikberg et al. .............. 370/338 |
| 2004/0068571 A1* | 4/2004 | Ahmavaara ................ 709/228 | | 2007/0287459 A1 | 12/2007 | Diachina et al. |
| 2004/0072593 A1 | 4/2004 | Robbins et al. | | 2007/0293222 A1 | 12/2007 | Vikberg et al. |
| 2004/0077355 A1 | 4/2004 | Krenik et al. | | 2008/0039086 A1 | 2/2008 | Gallagher et al. |
| 2004/0077356 A1 | 4/2004 | Krenik et al. | | 2008/0039087 A1 | 2/2008 | Gallagher et al. |
| 2004/0077374 A1 | 4/2004 | Terry | | 2008/0043669 A1 | 2/2008 | Gallagher et al. |
| 2004/0087307 A1 | 5/2004 | Ibe et al. | | 2008/0076386 A1 | 3/2008 | Khetawat et al. |
| 2004/0116120 A1 | 6/2004 | Mohammed et al. | | 2008/0076392 A1 | 3/2008 | Khetawat et al. |
| 2004/0147223 A1 | 7/2004 | Cho | | 2008/0076393 A1 | 3/2008 | Khetawat et al. |
| 2004/0162105 A1 | 8/2004 | Reddy et al. | | 2008/0076411 A1 | 3/2008 | Khetawat et al. |
| 2004/0171378 A1 | 9/2004 | Rautila | | 2008/0076412 A1 | 3/2008 | Khetawat et al. |
| 2004/0192211 A1 | 9/2004 | Gallagher et al. | | 2008/0076419 A1 | 3/2008 | Khetawat et al. |
| 2004/0202132 A1 | 10/2004 | Heinonen | | 2008/0076420 A1 | 3/2008 | Khetawat et al. |
| 2004/0203346 A1 | 10/2004 | Myhre et al. | | 2008/0076425 A1 | 3/2008 | Khetawat et al. |
| 2004/0203737 A1 | 10/2004 | Myhre et al. | | 2008/0117841 A1 | 5/2008 | Chen |
| 2004/0203800 A1 | 10/2004 | Myhre et al. | | 2008/0123596 A1 | 5/2008 | Gallagher et al. |
| 2004/0203815 A1 | 10/2004 | Shoemake et al. | | 2008/0125120 A1 | 5/2008 | Gallagher et al. |
| 2004/0219948 A1 | 11/2004 | Jones et al. | | 2008/0130564 A1 | 6/2008 | Gallagher et al. |
| 2004/0240525 A1 | 12/2004 | Karabinis et al. | | 2008/0130568 A1 | 6/2008 | Gallagher et al. |
| 2004/0264410 A1 | 12/2004 | Sagi et al. | | 2008/0132224 A1 | 6/2008 | Gallagher et al. |
| 2005/0041787 A1 | 2/2005 | Casey et al. | | 2008/0132239 A1 | 6/2008 | Khetawat et al. |
| 2005/0053070 A1 | 3/2005 | Jouppi | | 2008/0137612 A1 | 6/2008 | Gallagher et al. |
| 2005/0064896 A1 | 3/2005 | Rautiola et al. | | 2008/0165725 A1 | 7/2008 | Huomo et al. |

| | | | |
|---|---|---|---|
| 2008/0181204 | A1 | 7/2008 | Gallagher et al. |
| 2008/0207170 | A1 | 8/2008 | Khetawat et al. |
| 2008/0227468 | A1* | 9/2008 | Niska et al. ............. 455/456.2 |
| 2008/0299976 | A1 | 12/2008 | Gallagher et al. |
| 2008/0299977 | A1 | 12/2008 | Gallagher et al. |
| 2008/0305793 | A1 | 12/2008 | Gallagher et al. |

FOREIGN PATENT DOCUMENTS

| | | |
|---|---|---|
| EP | 1207708 B1 | 10/2004 |
| GB | 2282735 A | 4/1995 |
| WO | WO 9204796 A1 | 3/1992 |
| WO | WO 9724004 A1 | 7/1997 |
| WO | WO 9948312 A1 | 9/1999 |
| WO | WO 9948315 A1 | 9/1999 |
| WO | WO 0028762 A1 | 5/2000 |
| WO | WO 0051387 A1 | 8/2000 |
| WO | WO 02/45456 A1 | 6/2002 |
| WO | WO 03039009 A2 | 5/2003 |
| WO | WO 03039009 A3 | 5/2003 |
| WO | WO 03092312 A1 | 11/2003 |
| WO | WO 2004002051 A2 | 12/2003 |
| WO | WO 2004/036770 | 4/2004 |
| WO | WO 2004034219 A2 | 4/2004 |
| WO | WO 2004039111 A1 | 5/2004 |
| WO | WO 2005006597 A1 | 1/2005 |
| WO | WO 2005/060292 | 6/2005 |
| WO | WO 2005107169 A1 | 11/2005 |
| WO | WO 2005107297 A1 | 11/2005 |
| WO | WO 2005/114920 | 12/2005 |
| WO | WO 2005114918 A3 | 12/2005 |
| WO | PCT/US2005/040689 | 3/2006 |
| WO | WO 2006/053102 | 5/2006 |
| WO | WO 2008/009016 | 1/2008 |
| WO | WO 2008/036961 | 3/2008 |
| WO | WO 2008/055251 | 5/2008 |
| WO | PCT/US2008/072542 | 8/2008 |
| WO | PCT/US2008/076913 | 9/2008 |
| WO | WO 2008/106360 | 9/2008 |

OTHER PUBLICATIONS

U.S. Appl. No. 11/004,439, filed Dec. 3, 2004, Gallagher, Michael, Non-Final Office Action of related case mailed: Apr. 21, 2006.
U.S. Appl. No. 11/225,398, filed Sep. 12, 2005, Gallagher, Michael, Non-Final Office Action of related case mailed: Apr. 5, 2006.
U.S. Appl. No. 11/225,871, filed Sep. 12, 2005, Gallagher, Michael, Non-Final Office Action of related case mailed: Mar. 30, 2006.
U.S. Appl. No. 11/225,872, filed Sep. 12, 2005, Gallagher, Michael, Non-Final Office Action of related case mailed: May 8, 2006.
U.S. Appl. No. 11/226,610, filed Sep. 13, 2005, Gallagher, Michael, Non-Final Office Action of related case mailed: Mar. 29, 2006.
U.S. Appl. No. 11/226,617, filed Sep. 13, 2005, Gallagher, Michael, Non-Final Office Action of related case mailed: Apr. 4, 2006.
U.S. Appl. No. 11/227,573, filed Sep. 14, 2005, Gallagher, Michael, Non-Final Office Action of related case mailed: Apr. 16, 2006.
U.S. Appl. No. 11/227,784, filed Sep. 14, 2005, Gallagher, Michael, Non-Final Office Action of related case mailed: Mar. 28, 2006.
U.S. Appl. No. 11/227,840, filed Sep. 14, 2005, Gallagher, Michael, Non-Final Office Action of related case mailed: Apr. 21, 2006.
U.S. Appl. No. 11/225,870, filed Sep. 12, 2005, Gallagher, Michael, Non-Final Office Action of related case mailed: May 30, 2006.
U.S. Appl. No. 11/227,842, filed Sep. 14, 2005, Gallagher, Michael, Non-Final Office Action of related case mailed: Jun. 5, 2006.
U.S. Appl. No. 11/228,853, filed Sep. 15, 2005, Gallagher, Michael, Non-Final Office Action of related case mailed: Jun. 6, 2006.
U.S. Appl. No. 11/229,470, filed Sep. 15, 2005, Gallagher, Michael, Non-Final Office Action of related case mailed: Jun. 5, 2006.
U.S. Appl. No. 11/060,339, filed Feb. 16, 2005, Madhu Shekhar et al., Non-published patent application (specification, drawings, claims, abstract) of a related pending U.S. Patent Application.
U.S. Appl. No. 11/069,602, filed Feb. 28, 2005, Jianxiong Shi et al., Non-published patent application (specification, drawings, claims, abstract) of a related pending U.S. Patent Application.
U.S. Appl. No. 11/349,024, filed Feb. 6, 2006, Michael D. Gallagher, Non-published patent application (specification, drawings, claims, abstract) of a related pending U.S. Patent Application.
U.S. Appl. No. 11/352,422, filed Feb. 9, 2006, Michael D. Gallagher, Non-published patent application (specification, drawings, claims, abstract) of a related pending U.S. Patent Application.
Notice of Allowance of U.S. Appl. No. 10/688,470, Jul. 19, 2006 (mailing date), Gallagher, Michael, et al.
U.S. Appl. No. 11/110,222, filed Apr. 20, 2005, Gallagher, Michael, et al.
U.S. Appl. No. 11/068,445, filed Feb. 24, 2005, Gupta, Rajeev, et al.
Non-Final Office Action of U.S. Appl. No. 11/229,471, Nov. 17, 2008 (mailing date), Gallagher, Michael, et al.
Non-Final Office Action of U.S. Appl. No. 11/229,471, Feb. 6, 2008 (mailing date), Gallagher, Michael, et al.
Final Office Action of U.S. Appl. No. 11/229,471, Oct. 10, 2007 (mailing date), Gallagher, Michael, et al.
Non-Final Office Action of U.S. Appl. No. 11/229,471, Apr. 19, 2007 (mailing date), Gallagher, Michael, et al.
Non-Final Office Action of U.S. Appl. No. 11/229,471, Oct. 24, 2006 (mailing date), Gallagher, Michael, et al.
Non-Final Office Action of U.S. Appl. No. 11/229,471, Jun. 19, 2006 (mailing date), Gallagher, Michael, et al.
Non-Final Office Action of U.S. Appl. No. 11/228,853, Nov. 22, 2006 (mailing date), Gallagher, Michael, et al.
Notice of Allowance of U.S. Appl. No. 11/228,853, Feb. 23, 2007 (mailing date), Gallagher, Michael, et al.
Final Office Action of U.S. Appl. No. 11/229,470, Dec. 14, 2007 (mailing date), Gallagher, Michael, et al.
Non-Final Office Action of U.S. Appl. No. 11/229,470, Feb. 27, 2008 (mailing date), Gallagher, Michael, et al.
Non-Final Office Action of U.S. Appl. No. 11/229,470, Oct. 1, 2008 (mailing date), Gallagher, Michael, et al.
Non-Final Office Action of U.S. Appl. No. 11/778,043, Aug. 6, 2008 (mailing date), Gallagher, Michael, et al.
U.S. Appl. No. 12/233,571, filed Sep. 18, 2008, Khetawat, Amit, et al.
U.S. Appl. No. 12/187,360, filed Aug. 6, 2008, Gallagher, Michael, et al.
U.S. Appl. No. 12/193,598, filed Aug. 18, 2008, Gallagher, Michael, et al.
U.S. Appl. No. 12/194,442, filed Aug. 19, 2008, Gallagher, Michael, et al.
U.S. Appl. No. 12/328,719, filed Dec. 4, 2008, Gallagher, Michael, et al.
U.S. Appl. No. 12/328,732, filed Dec. 4, 2008, Gallagher, Michael, et al.
International Search Report for PCT/US2003/032855, Apr. 21, 2004 (mailing date), Kineto Wireless, Inc.
International Preliminary Report on Patentability and Written Opinion for PCT/US2005/016767, Nov. 14, 2006 (mailing date), Kineto Wireless, Inc.
International Preliminary Report on Patentability and Written Opinion for PCT/US2005/040689, May 15, 2007 (mailing date), Kineto Wireless, Inc.
International Search Report and Written Opinion for PCT/US2005/016921, Sep. 19, 2005 (mailing date), Kineto Wireless, Inc.
International Preliminary Report on Patentability and Written Opinion for PCT/US2005/016921, Nov. 23, 2006 (mailing date), Kineto Wireless, Inc.
International Search Report and Written Opinion for PCT/US2007/083266, Apr. 2, 2008 (mailing date), Kineto Wireless, Inc.
International Search Report and Written Opinion for PCT/US2008/054623, Aug. 18, 2008 (mailing date), Kineto Wireless, Inc.
International Search Report and Written Opinion for PCT/US2007/073557, Jul. 16, 2008 (mailing date), Kineto Wireless Inc.
International Search Report and Written Opinion for PCT/US2007/079258, Mar. 11, 2008 (mailing date), Kineto Wireless, Inc.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, 13 pages.

*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/ UMTS Interworking Profile (IWP); Part 1: General Description and Overview*: ETSI TS 101 863-1 V1.1.2, Technical Specification, European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.
"Unlicensed Mobile Access (UMA); User Perspective (Stage 1);" UMA User Perspective (Stage 1) R1.0.0 (Sep. 1, 2004) Technical Specification, 29 pages.
"Unlicensed Mobile Access (UMA); Architecture (Stage 2);" UMA Architecture (Stage 2) R1.0.0 (Sep. 1, 2004) Technical Specification, 78 pages.
"Unlicensed Mobile Access (UMA); Protocols (Stage 3);" UMA Protocols (Stage 3) R1.0.0 (Sep. 1, 2004) Technical Specification, 142 pages.
"Unlicensed Mobile Access (UMA); Architecture (Stage 2);" UMA Architecture (Stage 2) R1.0.1 (Oct. 8, 2004) Technical Specification, 80 pages.
"Unlicensed Mobile Access (UMA); Protocols (Stage 3);" UMA Protocols (Stage 3) R1.0.1 (Oct. 8, 2004) Technical Specification, 142 pages.
"Unlicensed Mobile Access (UMA); Architecture (Stage 2);" UMA Architecture (Stage 2) R1.0.2 (Nov. 3, 2004) Technical Specification, 79 pages.
"Unlicensed Mobile Access (UMA); Protocols (Stage 3);" UMA Protocols (Stage 3) R1.0.2 (Nov. 5, 2004) Technical Specification, 142 pages.
"Unlicensed Mobile Access (UMA); Architecture (Stage 2);" UMA Architecture (Stage 2) R1.0.3 (Feb. 28, 2005) Technical Specification, 85 pages.
"Unlicensed Mobile Access (UMA); Protocols (Stage 3);" UMA Protocols (Stage 3) R1.0.3 (Feb. 26, 2005) Technical Specification, 156 pages.
"Unlicensed Mobile Access (UMA); Architecture (Stage 2);" UMA Architecture (Stage 2) R1.0.4 (May 2, 2005) Technical Specification, 87 pages.
"Unlicensed Mobile Access (UMA); Protocols (Stage 3);" UMA Protocols (Stage 3) R1.0.4 (May 2, 2005) Technical Specification, 162 pages.
"3$^{rd}$ Generation Partnership Project; Technical Specification Group GSM/EDGE Radio Access Network; Generic Access to the A/Gb interface; Stage 2 (Release X);" 3GPP TS 43.318 V0.3.0 (Jan. 2005), 64 pages.
"Proposal for Stage 2 description for Generic Access to A/Gb interface", Tdoc GP-050403, Jan. 24-28, 2005, 1 page.
"3$^{rd}$ Generation Partnership Project; Technical Specification Group GSM/EDGE Radio Access Network; Generic Access to the A/Gb interface; Stage 2 (Release 6)" 3GPP TS 43.318 V0.4.0 (Jan. 2005), 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V2.0.0 (Jan. 2005), 66 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.0.0 (Jan. 2005), 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.1.0 (Jan. 2005), Apr. 2005, 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.2.0 (Jun. 2005), 68 pages.
"Proposal for Stage 3 description for Generic Access to A/Gb interface", Tdoc GP-050279, Jan. 18, 2005, 1 page.
"3$^{rd}$ Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0 (Jan. 2005), 133 pages.
"3$^{rd}$ Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0 (Apr. 2005), 161 pages.
"3$^{rd}$ Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0, Apr. 2005, 160 pages.
"3$^{rd}$ Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0, Apr. 2005, 152 pages.
"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0, Apr. 2005, 146 pages.
"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.1.0, Jul. 2005, 149 pages.
International Search Report and Written Opinion for PCT/US2008/076913, Dec. 22, 2008 (mailing date), Kineto Wireless, Inc.
U.S. Appl. No. 10/116,311 (Non-Final Office Action mailed: Feb. 9, 2006), filed Apr. 2, 2002, Jahangir Mohammed.
U.S. Appl. No. 10/115,767 (Non-Final Office Action mailed: Dec. 22, 2005), filed Apr. 2, 2002, Jahangir Mohammed.
U.S. Appl. No. 10/115,835 (Non-Final Office Action mailed: Jul. 25, 2005), filed Apr. 2, 2002, Jahangir Mohammed.
U.S. Appl. No. 10/116,186 (Non-Final Office Action mailed: Feb. 1, 2006), filed Apr. 2, 2002, Jahangir Mohammed.
U.S. Appl. No. 10/251,901 (Non-Final Office Action mailed: May 5, 2005), filed Sep. 20,2002, Michael D. Gallagher.
U.S. Appl. No. 10/688,470 (Non-Final Office Action mailed: Dec. 15, 2005), filed Oct. 17, 2003, Michael D. Gallagher.
U.S. Appl. No. 11/004,439 (Non-Final Office Action mailed: Sep. 21, 2005), filed Dec. 3, 2004, Michael D. Gallagher.
*Ericsson Press Release*: "Ericsson presents the Mobile@Hometm concept," Mar. 21, 2001, http://www.ericsson.com/press/archive/2001Q1/20010321-0048.html, printed Mar. 21, 2006, pp. 1-2.
Claus Lindholt Hansen et al., "Mobile@Home- a New Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C. et al., "Intelligent Handoff for Mobile Wireless Internet," *Mobile Networks and Applications*, 6, 2001 Kluwer Academic Publishers, Manufactured in the Netherlands (2001) 67-79.
"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.

"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.

Portions of prosecution history of U.S. Appl. No. 11/013,883, filed Aug. 6, 2009, Gallagher, Michael, et al.

International Search Report and Written Opinion for PCT/US2004/042456, Apr. 27, 2005 (mailing date), Kineto Wireless, Inc.

International Preliminary Report on Patentability for PCT/US2004/042456, Jun. 20, 2006 (issuance date), Kineto Wireless, Inc.

* cited by examiner

| | | |
|---|---|---|
| CM (CC/SS/SMS) | | |
| MM | | |
| RANAP | ALCAP | |
| SCCP | STC(Q.2150.1) | |
| MTP-3b | MTP-3b | |
| SSCF-NNI | SSCF-NNI | |
| SSCOP | SSCOP | Iu UP |
| AAL5 | AAL5 | AAL2 |
| ATM | ATM | ATM |
| L1 | L1 | L1 |
| Control Plane | Transport Control Plane | User Plane |
| Iu-CS | | |

Fig. 4B

| | | |
|---|---|---|
| CM (SM/GSMS) | | |
| GMM | | |
| RANAP | | |
| SCCP | | Iu UP |
| MTP-3b | M3UA | GTP-U |
| SSCF-NNI | SCTP | UDP |
| SSCOP | IP | IP |
| AAL5 | | AAL5 |
| ATM | | ATM |
| L1 | | L1 |
| Control Plane | | User Plane |
| Iu-PS | | |

MECHANISMS TO EXTEND UMA OR GAN TO INTER-WORK WITH UMTS CORE NETWORK

CROSS-REFERENCE TO RELATED APPLICATIONS

This application is related to commonly-owned U.S. applications: Ser. No. 11/096,800, entitled, "A Method and System for Determining the location of an Unlicensed Mobile Access Subscriber," filed Mar. 31, 2005, now issued as U.S. Pat. No. 7,369,859; Ser. No. 11/129,134, entitled, "Messaging in an Unlicensed Mobile Access Telecommunications System,+ filed May 12, 2005, now published as U.S. Publication 2005/0272449; Ser. No. 11/129,424, entitled "Handover Messaging in an Unlicensed Mobile Access Telecommunications System," filed May 12, 2005, now issued as U.S. Pat. No. 7,565,145; Ser. No. 11/129,131, entitled, "Registration Messaging in an Unlicensed Mobile Access Telecommunications System," filed May 12, 2005, now issued as U.S. Pat. No. 7,349,698; Ser. No. 11/128,615, entitled, "Channel Activation Messaging in an Unlicensed Mobile Access Telecommunications System," filed May 12, 2005, now issued as U.S. Pat. No. 7,471,655; and Ser. No. 11/128,461, entitled, "Apparatus and Messages for Interworking Between Unlicensed Access Network and GPRS Network for Data Services," filed May 12, 2005, now issued as U.S. Pat. No. 7,606,190, the contents of each of which are hereby incorporated by reference.

FIELD OF THE INVENTION

The field of invention relates generally to telecommunications. More particularly, this invention relates to a mechanism for extending Unlicensed Mobile Access (UMA) or Generic Access Network (GAN) to inter-work with a Universal Mobile Telecommunication System (UMTS) core network.

BACKGROUND INFORMATION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks have seen rapid growth. For example, such unlicensed wireless systems may support wireless communication based on the IEEE 802.11a, b or g standards (WiFi), or the Bluetooth™ standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth™ standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion, thus enabling a user to access, via a single handset, an unlicensed wireless system when within the range of such a system, while accessing a licensed wireless system when out of range of the unlicensed wireless system. unlicensed wireless networks and for directing them to an appropriate network controller.

SUMMARY OF THE INVENTION

In accordance with aspects of the present invention, mechanisms to extend UMA (Unlicensed Mobile Access) or GAN (General Access Network) to inter-work with a UMTS (Universal Mobile Telecommunications System) core network are disclosed. A UMA network controller (UNC) is provided to interface between a UMA/GAN network and a UMTS core network using the standard Iu-CS and Iu-PS interfaces. From the viewpoint of the UMTS core network, the UNC appears as another Radio Network Controller (RNC). Protocol layer schemes are disclosed for mobile stations, UNCs, SGSNs and MSCs to support signaling and data messaging in both the packet-switched and circuit-switched domains. The mobile stations provide dual-mode operation, such that they are able to access the UMTS core network via unlicensed service when in a UMA/GAN access area, and to access the UMTS core network via licensed service when outside of a UMA/GAN access area and in a UTRAN service area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1B illustrates protocol layers of a mobile station in accordance with one embodiment;

FIG. 1C illustrates a method of protocol conversion in accordance with one embodiment;

FIG. 4A illustrates the protocol layers employed by the Iu-CS standard interface;

FIG. 4B illustrates the protocol layers employed by the Iu-PS standard interface;

DETAILED DESCRIPTION

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present description the unlicensed wireless system may be a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Application of the present invention to this type of device enables the wireless service provider to offer so-called landline replacement service to users, even for user locations not sufficiently covered by the licensed wireless system. The present description is in the context of the UMA (Unlicensed Mobile Access) standardized architecture as promulgated by the UMA consortium. However, the invention is not so limited.

Throughout the following description, acronyms commonly used in the telecommunications industry for wireless services are utilized along with acronyms specific to the present invention. A table of acronyms specific to this application is included in Appendix I.

Figure 1A:
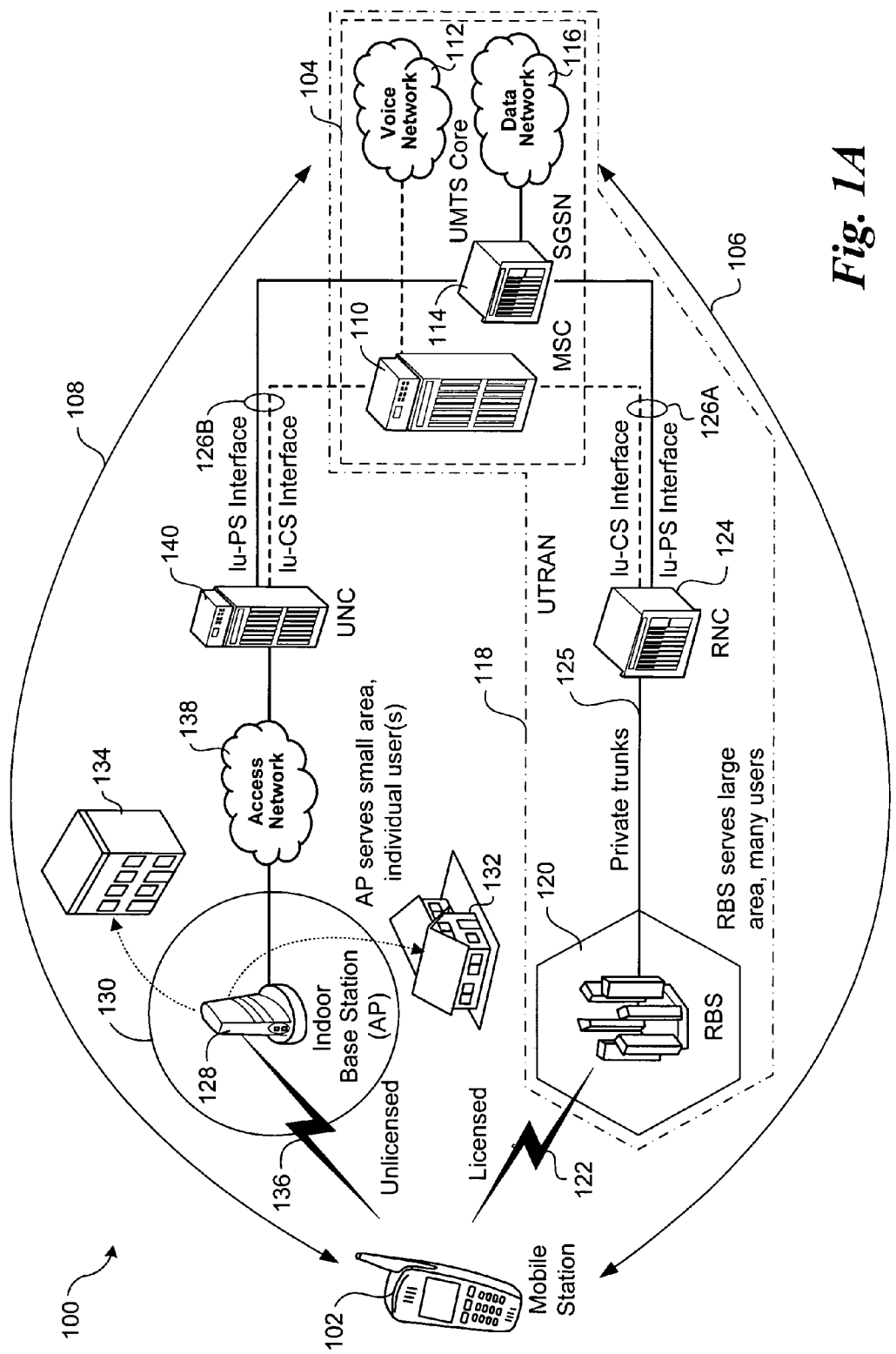
FIG. 1A provides an overview of the UMA mobile service solution that supports inter-working with a UMTS core network, in accordance with one embodiment of the present invention.

FIG. 1A illustrates an Unlicensed Mobile Access (UMA) architecture 100 with extended features to support inter-working with a UMTS (Universal Mobile Telecommunication System) core network (CN), in accordance with one embodiment of the present invention. With respect to aspects of the present invention, the use of the term "extended" relates to extension to UMA architecture embodiments previously described in related applications cited above and/or published UMA specifications to support inter-working with UMTS core networks. In general, these prior embodiments support UMA access to GSM (Global System for Mobile Communication) core networks. Such extended functionality may be identified by adding a "+" symbol to some components, indicating that such components support both UMTS and GSM network access. At the same time, it will be recognized that implementation of various components to support only UMTS network access are also contemplated. For simplicity and clarity, only those aspects related to UMTS network access are disclosed herein. Details for supporting UMA access to GSM networks are disclosed in the aforementioned related applications. In addition, further details of UMA-related aspects of the embodiments described herein are defined in specifications published by the UMA consortium, including Unlicensed Mobile Access (UMA) Architecture (Stage 2), Version 1.0.4, May 2, 2005, and Unlicensed Mobile Access (UMA) Protocols (Stage 3), Version 1.0.4, May 2, 2005. The 3GPP equivalents for these documents are TS 43.318 and TS 44.318, respectively.

UMA architecture 100 enables a user of a mobile station 102 to access a UMTS core network 104 via either a licensed wireless communications session 106, or an unlicensed wireless communication session 108. The UMTS core network 104 is depicted to include a Mobile services Switching Center (MSC) 110, which provides access to a voice network 112, and a Serving GPRS (General Packet Radio Service) Support Node (SGSN) 114, which provides access to a data network 116. In addition, the UMTS core network may include various other components typically implemented in UMTS networks, as are well-known in the art.

In further detail, the licensed wireless communication session is facilitated by infrastructure provided by a licensed wireless network 118 that includes UMTS core network 104. In the illustrated embodiment, licensed wireless network 118 depicts components common to a UMTS-based cellular network that includes multiple Radio Base Stations (RBS) 120 (of which only one is shown for simplicity) that facilitate wireless communication services for various mobile stations 102 via respective licensed radio links 122 (e.g., radio links employing radio frequencies within a licensed bandwidth). Under UMTS, a Radio Base Station is commonly referred to as "Node B." Typically, the multiple RBSs 120 are configured in a cellular configuration (one per each cell) that covers a wide service area. The various RBSs 120 for a given area or region are managed by a Radio Network Controller (RNC) 124, with each RBS 120 communicatively-coupled to its RNC 124 via a private trunk 125. In general, a large licensed wireless network, such as that provided by a regional or nationwide mobile services provider, will include multiple RNCs 124. The RBSs 120 and RNCs 124 collectively comprise a UMTS Terrestrial Radio Access Network (UTRAN).

The UMTS core network is divided into circuit-switched and packet-switched domains. Some of the circuit-switched elements include MSC 110, Visitor Location Register (VLR) and Gateway MSC (latter two both not shown). Packet-switched elements include SGSN 114 and Gateway GPRS Support Node (GGSN) (not shown). Some network elements, such as EIR, HLR, VLR and AUC (all not shown) are shared by both domains.

The architecture of the UMTS core network may change when new services and features are introduced. Number Portability DataBase (NPDB) will be used to enable user to change the network while keeping their existing phone number. Gateway Location Register (GLR) may be used to optimize the subscriber handling between network boundaries.

Each RNC 124 communicates with UMTS core network 104 through a standard RNC interface 126. For example, a RNC 124 may communicate with MSC 110 via the Iu-CS (circuit-switched) interface for circuit switched voice services and with SGSN 114 via the Iu-PS (packet-switched) interface for packet data services. The UMTS core network 104 includes protocols to permit seamless handoffs from one serving RNC 124 to another RNC (not shown) to provide mobile access across cells.

An unlicensed communication session 108 is facilitated via an (wireless) access point (AP) 128 comprising an indoor base station 130. (As used herein, an AP and indoor base station are one in the same. However, the separate terminology is provided to identify that AP's need not be indoor.) Typically, AP 128 will be located in a fixed structure, such as a home 132 or an office building 134. The service area of indoor base station 130 generally includes an indoor portion of such a home or building, although it will be understood that the service area of an indoor base station may include an outdoor portion of a building or campus. As indicated by the arrow representing unlicensed communication session 108, the mobile station 102 may be connected to UMTS core network 104 via a second data path that includes an unlicensed wireless channel 136, access point 128, an access network 138, and an unlicensed mobile access network controller (UNC) 140. The UNC 140 communicates with UMTS core network 104 using a RNC interface 126B that is similar to or the same as RNC interface 126A, and includes an Iu-CS interface and an Iu-PS interface. AP 128 may include software entities stored in memory and executing on one or more microprocessors (not shown in FIG. 1A) adapted to perform protocol conversion. In one embodiment, AP 128 comprises a standard unlicensed access point (e.g., WiFi, Bluetooth™, etc.).

The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting unlicensed wireless channel 136 may have an associated communication protocol. As examples, the unlicensed wireless service may be a Bluetooth™ compatible wireless service supporting a Bluetooth personal local area network (PLAN), or a wireless local area network (LAN) (WiFi) service (e.g., the IEEE 802.11a, b, or g wireless standard). This provides the user with potentially improved quality of service in the service regions of the unlicensed wireless service (i.e., within the service range of a corresponding AP). Thus, when a subscriber is within range of the unlicensed AP, the subscriber may enjoy low cost, high speed, and high quality voice and data services. In addition, the subscriber enjoys extended service range since the handset can receive services deep within a building at locations that otherwise may not be reliably serviced by a licensed wireless system. At the same time, the subscriber can roam outside the range of the unlicensed AP without dropping communications. Instead, roaming outside the range of the unlicensed AP results in a seamless handoff (also referred to as a handover) wherein communication services are automatically provided by the licensed wireless system, as described in more detail in U.S. patent application Ser. No. 10/115,833, the contents of which are hereby incorporated by reference.

Mobile station 102 may include a microprocessor and memory (not shown) that stores computer program instructions for executing wireless protocols for managing communication sessions. (Further details of aspects mobile station operation are described below with reference to FIGS. 7 and 8.) As illustrated in FIG. 1B, in one embodiment the mobile station 102 includes a layer 1 protocol layer 142, layer 2 protocol layer 144, and a layer 3 signaling protocol layer for the licensed wireless service that includes a radio resource (RR) sublayer 146, a mobility management (MM) sublayer 148, and a call management (CM) layer 150. It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RR sublayer is concerned with the management of an RR-session, which is the time that a mobile station is in a dedicated mode, as well as the configuration of radio channel, power controller, discontinuous transmission and reception, and handovers. The mobility management layer manages issues that arise from the mobility of the subscriber. The mobility management layer may, for example, deal with mobile station location, security functions, and authentication. The call control management layer provides controls for end-to-end call establishment. These functions for a licensed wireless system are well known by those in the art of wireless communication.

The mobile station may also include an unlicensed wireless service physical layer 152 (i.e., a physical layer for unlicensed wireless service such as Bluetooth, WiFi, or other unlicensed wireless channel (e.g., WiMAX)). The mobile station also includes an unlicensed wireless service level 2 link layer 154, and an unlicensed wireless service radio resource sublayer(s) 156 and networking layers 158. An access mode switch 160 is included for the mobility management 148 and call management layers 150 to access the unlicensed wireless service radio resource sublayer 156 and unlicensed wireless service link layer 154 when the mobile station 102 is within range of an unlicensed AP 128 and to support switching between licensed RR sublayer 146 and unlicensed wireless service RR sublayer 156.

The unlicensed radio resource sublayer 156 and unlicensed link layer 154 may include protocols specific to the unlicensed wireless service utilized in addition to protocols selected to facilitate seamless handoff between licensed and unlicensed wireless systems. Consequently, the unlicensed radio resource sublayer 156 and unlicensed link layer 154 need to be converted into a format compatible with a conventional RNC interface protocol 126 recognized by UMTS core network interfaces such as MSC 110 and SGSN 114.

Referring to FIG. 1C, in one embodiment of the present invention, the mobile station 102, AP 128 and UNC 140 provide an interface conversion function to convert the level 1, level 2, and level 3 layers of the unlicensed service into a conventional RNC interface 126B (e.g., Iu-CS interface and an Iu-PS interface). As a result of the protocol conversion, a communication session may be established that is transparent to UMTS core network 104, i.e., the UMTS CN uses its standard interface and protocols for the communication session as it would with a conventional communication session handled by a conventional RNC. For example, in some embodiments the mobile station 102 and UNC 140 are configured to initiate and forward location update and service requests. As a result, protocols for a seamless handoff of services that is transparent to voice/data network 104 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

When operating in the UMTS access context, UNC 140 appears to UMTS core network as an RNC network element and is managed and operated as such. In this architecture the principle elements of transaction control (e.g., call processing) are provided by higher network elements; namely the MSC 110 VLR and SGSN 114. Authorized mobile stations are allowed access to the UMTS core network either directly through the UTRAN if they are outside of the service area of an AP 128 or via the UMA network system if they are within the service area of an AP.

Since a communication session hosted by the UMA architecture 100 is transparent to a voice network 112 or data network 116, the unlicensed wireless service may support all user services that are typically offered by a wireless service provider. In the UMTS case, this typically includes the following basic services: Telephony; Emergency call (e.g., E911 calling in North America); Short message, mobile-terminated point-to-point (MT/PP); Short message, mobile-originated point-to-point (MO/PP); UMTS bearer services; and Handover (outdoor-to-indoor, indoor-to-outdoor, voice, data, SMS, SS). Additionally, the UMTS core network may also support, various supplementary services that are well-known in the art.

Figure 2A:
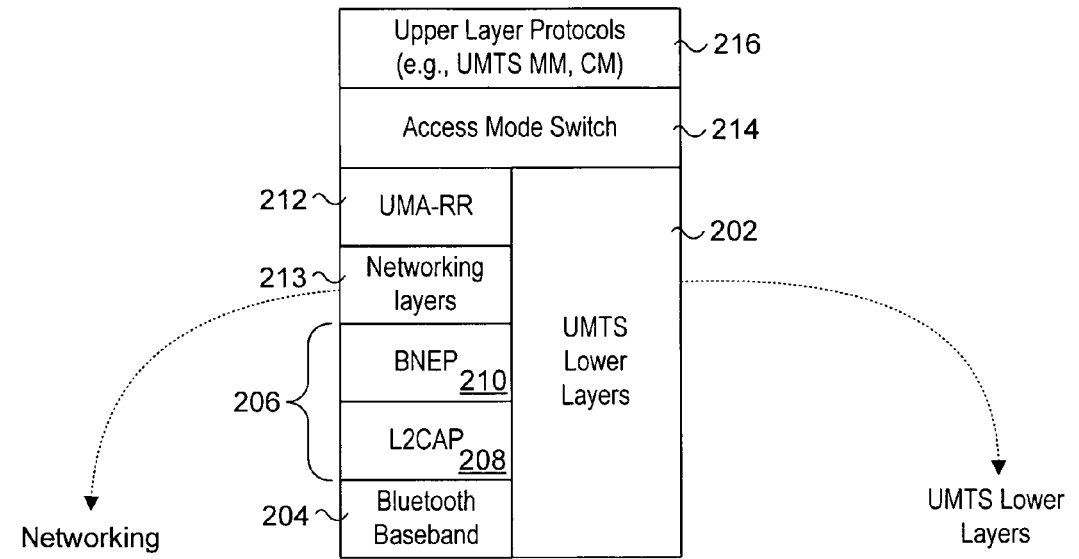
FIG. 2A illustrates an overview of a UMTS-related protocol architecture for one embodiment of a mobile station that provides unlicensed radio links via Bluetooth signaling.

FIG. 2A provides an overview of a level 1, level 2, and level 3 UMTS-related protocol architecture for one embodiment of mobile station 102 that provides unlicensed radio links via Bluetooth signaling. The protocol architecture includes UMTS lower layers 202, a Bluetooth baseband level 1 layer 204, Bluetooth level 2 layers 206 including a layer 2 connection access procedure (L2CAP) layer 208 and a BNEP layer 210, UMA-RR (radio resource) entity 212, networking layers 213, an access mode switch 214, and upper layer protocols 216. As shown toward the right-hand portion of the drawing sheet, UMTS lower layers 202 include a Radio Resource Control (RRC) layer 218, a Radio Link Control (RLC) layer 220, a MAC layer 222, and a Physical (PHY) layer 224.

When the mobile station is operating in an UMA mode, the UMA-RR entity 212 is the current "serving" RR entity providing service to the mobility management (MM) sublayer via the designated service access point (RR-SAP). The corresponding UMTS lower layer entity is detached from the MM sublayer in this mode. The UMA-RR entity 212 provides a new set of functions, and is responsible for several tasks. First the UMA-RR entity is responsible for discovery of UMA coverage and UMA registration. Second, the UMA-RR entity is responsible for emulation of the UMTS RR layer to provide the expected services to the MM layer; i.e., create, maintain and tear down RR connections. The plug-in of UMA-RR entity 212 is made transparent to the upper layer protocols in this way. Third, a UMA-RR entity 212 is responsible for coordination with the UMTS lower layers to manage access mode switching and handover.

Figure 2B:
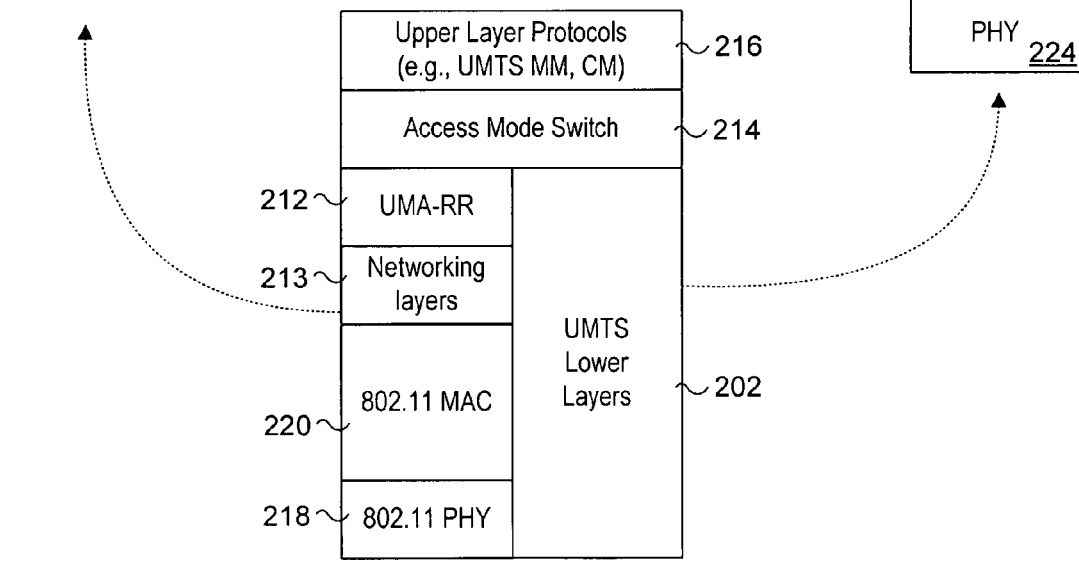
FIG. 2B illustrates an overview of a UMTS-related protocol architecture for one embodiment of a mobile station that provides unlicensed radio links via IEEE 802.11 signaling.

FIG. 2B provides an overview of a level 1, level 2, and level 3 UMTS-related protocol architecture for one embodiment of mobile station 102 that provides unlicensed radio links via IEEE 802.11 signaling. All of the entities and layers are the same as described above for FIG. 2A, except that the Bluetooth layers have been replaced with an 802.11 PHY layer 226 and an 802.11 MAC layer 228.

Figure 3B:
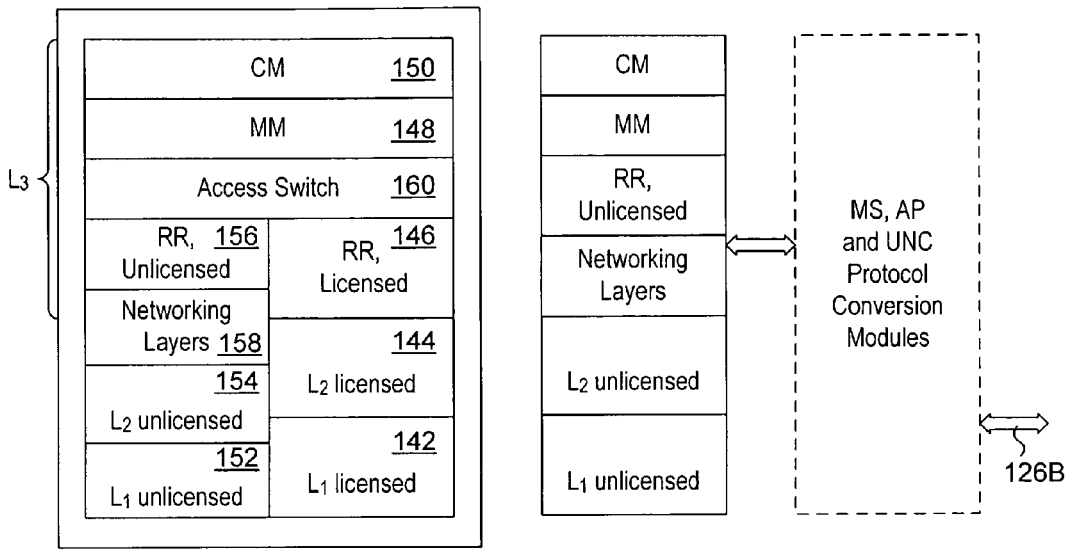
FIG. 3B shows Bluetooth lower layers employed by a mobile station and access point to facilitate physical layer communications.
Figure 3B:
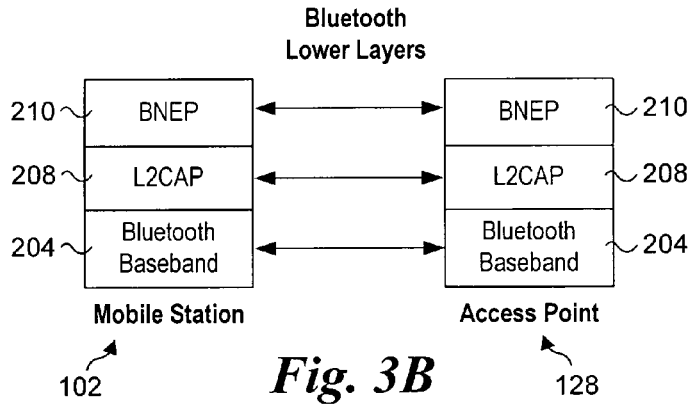
Figure 3C:
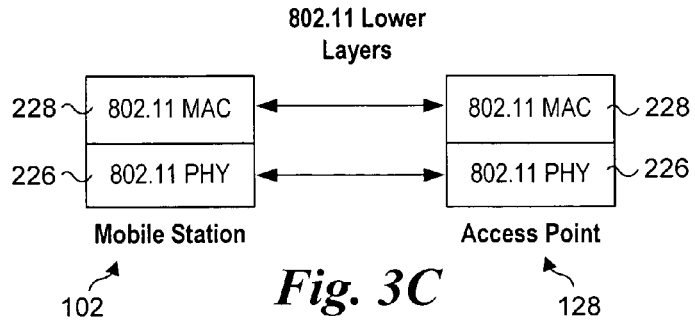
FIG. 3C shows Bluetooth lower layers employed by a mobile station and access point to facilitate physical layer communications.
Figure 3A:
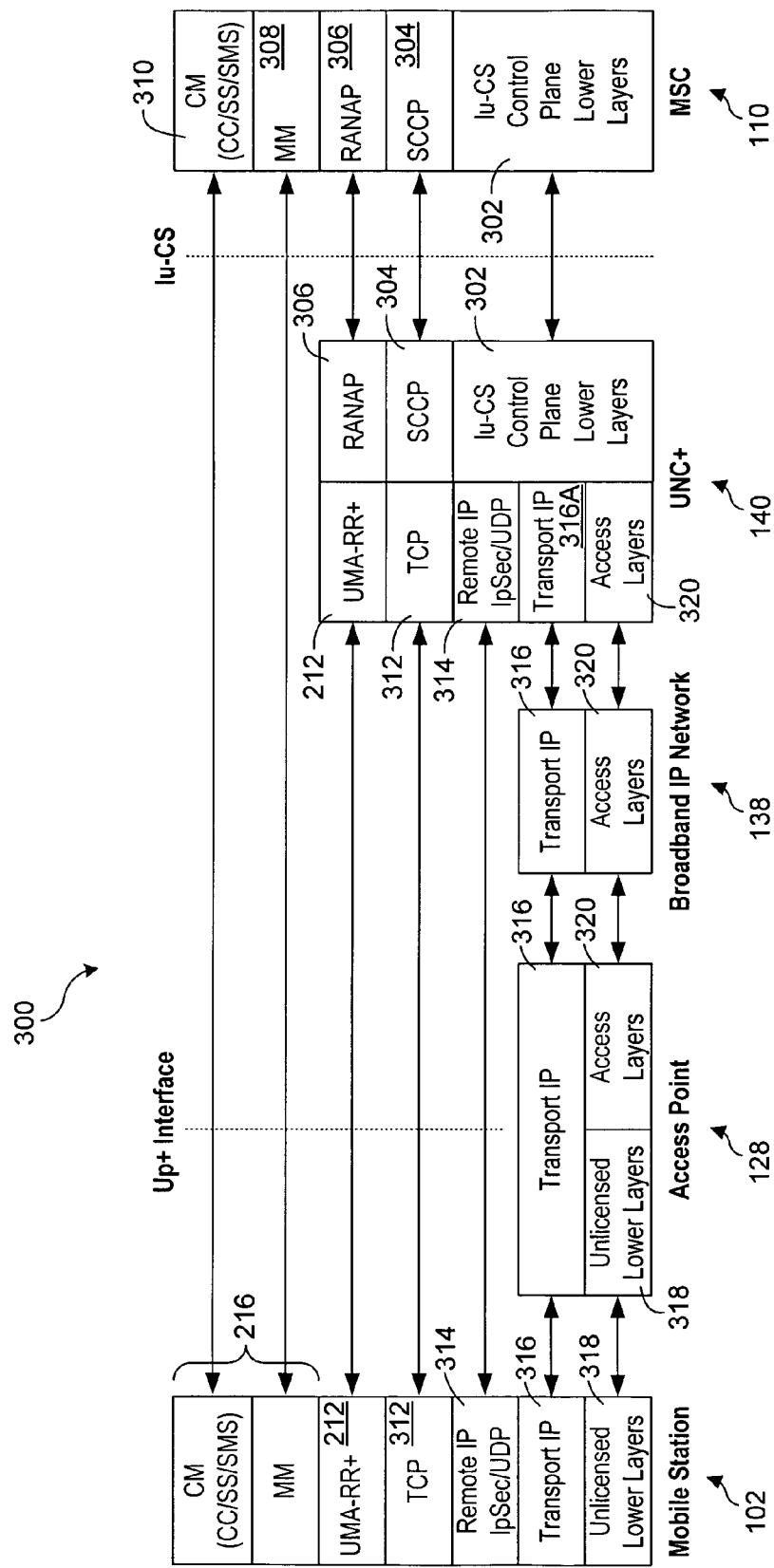
FIG. 3A illustrates the Up interface protocol architecture in support of CS Domain signaling, as well as UMA-specific signaling, according to one embodiment.

FIG. 3A illustrates a system interface protocol architecture 300 to support signaling protocols for circuit switched service while interworking with a UMTS core network via the Iu-CS interface. The MSC sub-layers are conventional, well known features known in the art for UMTS MSCs, and include Iu-CS lower layers 302, signaling connection control part (SCCP) layer 304, RAN application part (RANAP) layer 306, mobility management (MM) interface 308, and connection management (CM) interface 310. The Iu-CS lower layers 302 represent UNC+ and MSC sublayers used to support control plane aspects of the Iu-CS interface, further details of which are illustrated in FIG. 4a (i.e., the layers below the SCCP layer).

Under architecture 300, CS signaling messages are transported between MS 102 and UNC+ 140 using the enhanced UMA-RR+ protocol, which supports the UMA "layer 3" signaling functions via UMA-RR+ layers 212 provided by each of the mobile station 102 and UNC+ 140. The UMA-RR+ (URR+) protocol comprises a modified version of the URR protocol that supports UMTS-specific information and procedures. The UNC+ 140, functioning like an RNC, terminates UMA-RR+ protocol messages and is responsible for the interworking between these messages and the analogous Iu-CS-interface messages. The CS signaling messages are relayed between UNC 140 and MSC 110 over the RANAP layer 306 as per the standard Iu-CS interface.

The layers below the UMA-RR+ layer 212 in each of mobile station 104 and UNC+ 140 include a TCP layer 312, and a remote IP IpSec (IP security)/UDP layer 314. As an option, a standard Secure Socket Layer (SSL) protocol running over TCP/IP (not shown) may be deployed in place of IPSec.

Lower-level IP connectivity between mobile station 102 and UNC+ 140 is supported by appropriate layers hosted by an intervening access point 128 and broadband IP network 138 (i.e., the access network 138 shown in FIG. 1A). The components for supporting the IP transport layer (i.e., the conventional network layer 3 under the seven-layer OSI model) include transport IP layers 316 for each of the mobile station 104, AP 128, and IP network 138, and an IP layer 316A at UNC+ 140. As shown on the left-hand portion of the drawings sheet for FIGS. 2A and 2B, TCP layer 312, Remote IP IpSec/UDP layer 314, and Transport IP layer 316 collectively comprise networking layers 213.

At the lowest layers (i.e., the physical and data link layers), mobile station 104 and AP 128 are depicted as providing unlicensed lower layers 318, while each of AP 128, IP network 138, and UNC 140 provide appropriate access layers 320. Typically, access layers 320 will include conventional Ethernet PHY and MAC layers (IEEE 802.3), although this is not limiting.

As shown in FIGS. 3B and 3C, the unlicensed lower layers 318 will depend on whether the unlicensed radio link uses Bluetooth signaling or IEEE 802.11 signaling. The Bluetooth lower layers depicted in FIG. 3B correspond to the mobile station architecture of FIG. 2A, and include a Bluetooth baseband layer 204, an L2CAP layer 208, and a BNEP layer 210. Meanwhile, the 802.11 lower layers shown in FIG. 3C correspond to the mobile station architecture of FIG. 2B, and include a 802.11 PHY layer 226 and an 802.11 MAC layer 228.

Figure 3D:
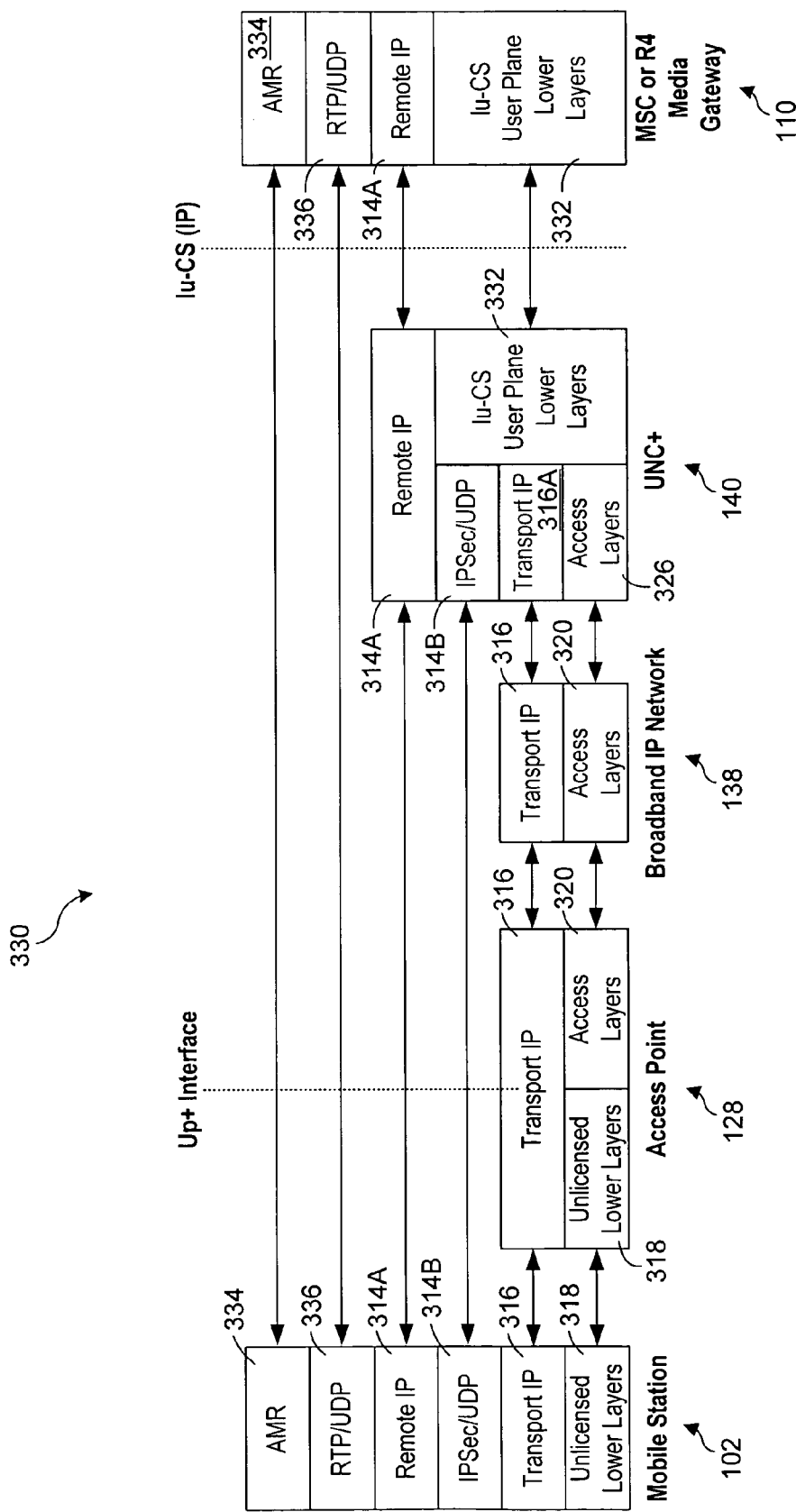
FIG. 3D illustrates a system interface protocol architecture to support CS user plane transport, according to one embodiment.

FIG. 3D illustrates a system interface protocol architecture 330 to support CS user plane transport where the RTP stream end points are an MS 102 and MSC 110 leveraging the Iu-CS transparent mode. In addition to the like-named and referenced components common to the architectures of FIGS. 3D and 3A, architecture 330 employs Iu-CS user plane lower layers 332 at both the UNC+ 140 and MSC 114. Adaptive multi-rate (AMR) codecs 334 are employed at each of the mobile station 102 and MS 114. A common UMA secure tunnel is facilitated by Remote IP layers 314A and IPSec/UDP layers 314B at mobile station 102 and UNC+ 140. The RTP (real-time protocol) packets are transported via the common UMA secure tunnel terminated by the Security Gateway (SGW) within the UNC+ (see FIG. 6 below). The SGW extracts and forwards the uplink RTP packets to MSC 114 via an RTP/UDP layer 336 running over the remote IP layer 314A. In the downlink direction, the SGW forwards the RTP packets to MS 102 via the common UMA secure tunnel.

Figure 3E:
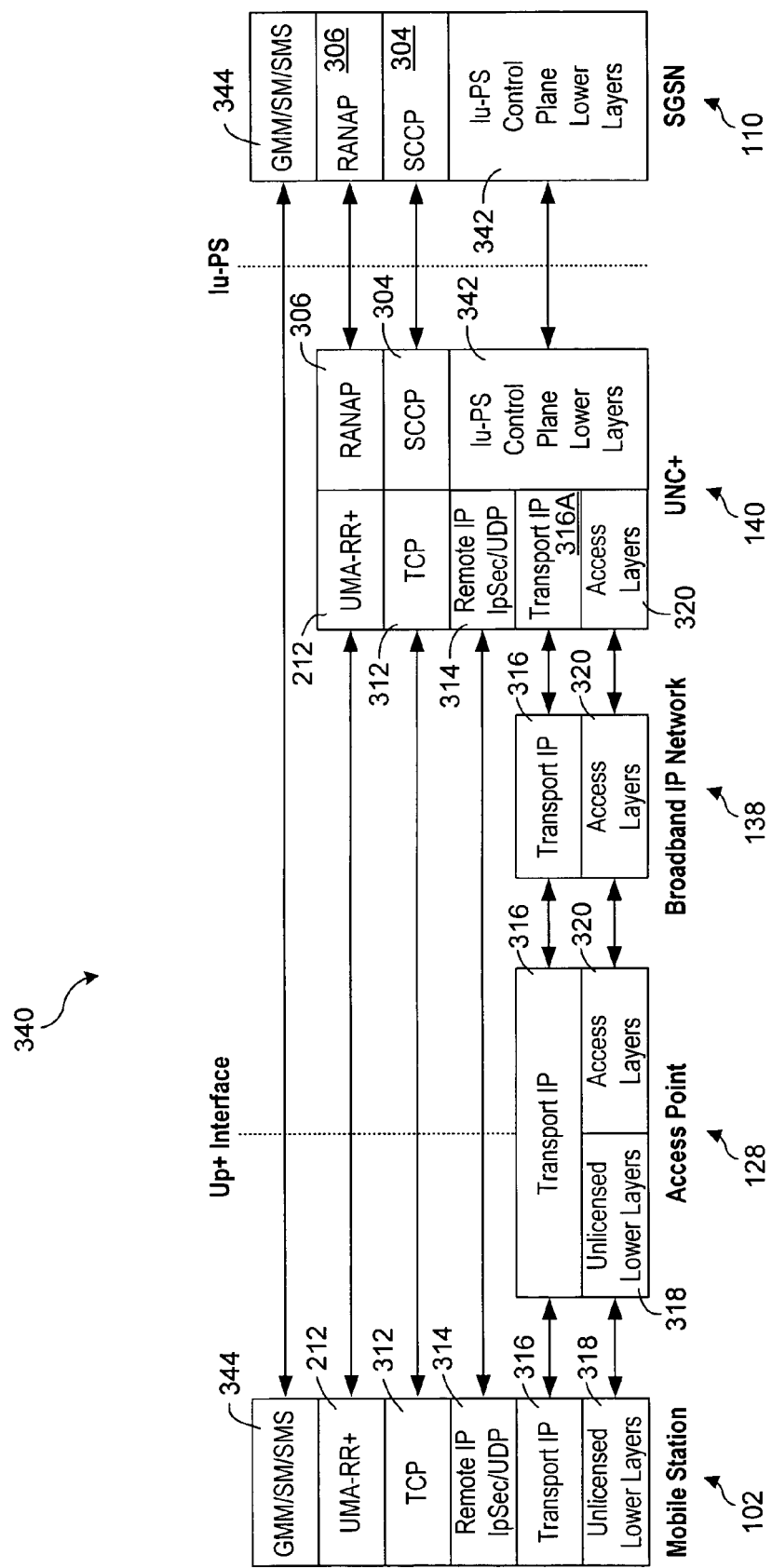
FIG. 3E illustrates a system interface protocol architecture to support signaling messages for PS service while inter-working with the UMTS core network, according to one embodiment.

FIG. 3E illustrates a system interface protocol architecture 340 to support signaling messages for PS service. The PS signaling, as well as the data messages for PS service shown in FIG. 3F utilize a modified URLC+ (UMA RLC+) protocol (URLC messaging is described in Ser. No. 11/128,461 cited above). Signaling messages for PS service including GAN/UMA-specific signaling messages are transported between MS 102 and UNC+ 140 via the common UMA signaling TCP session that is used for both CS and PS services. UMTS-specific signaling messages are relayed to/from SGSN 110 via the standard Iu-PS/RANAP interface. The assumption is that the IP-based Iu interface is deployed.

In addition to the like-named and referenced components common to the architectures of FIGS. 3E and 3A, architecture 340 includes Iu-PS control plane lower layers 342 at UNC+ 140 and SGSN 110 and a GMM/SM/SMS layer 344 at the MS and SGSN endpoints. Further details of the Iu-PS control plane lower layers 342, which are well-known conventional Iu-PS layers, are shown in FIG. 4B. The GMM/SM/SMS layer 344 includes functionality to support GPRS mobility management (GMM), Session Management (SM), and Short Message Service (SMS).

Figure 3F:
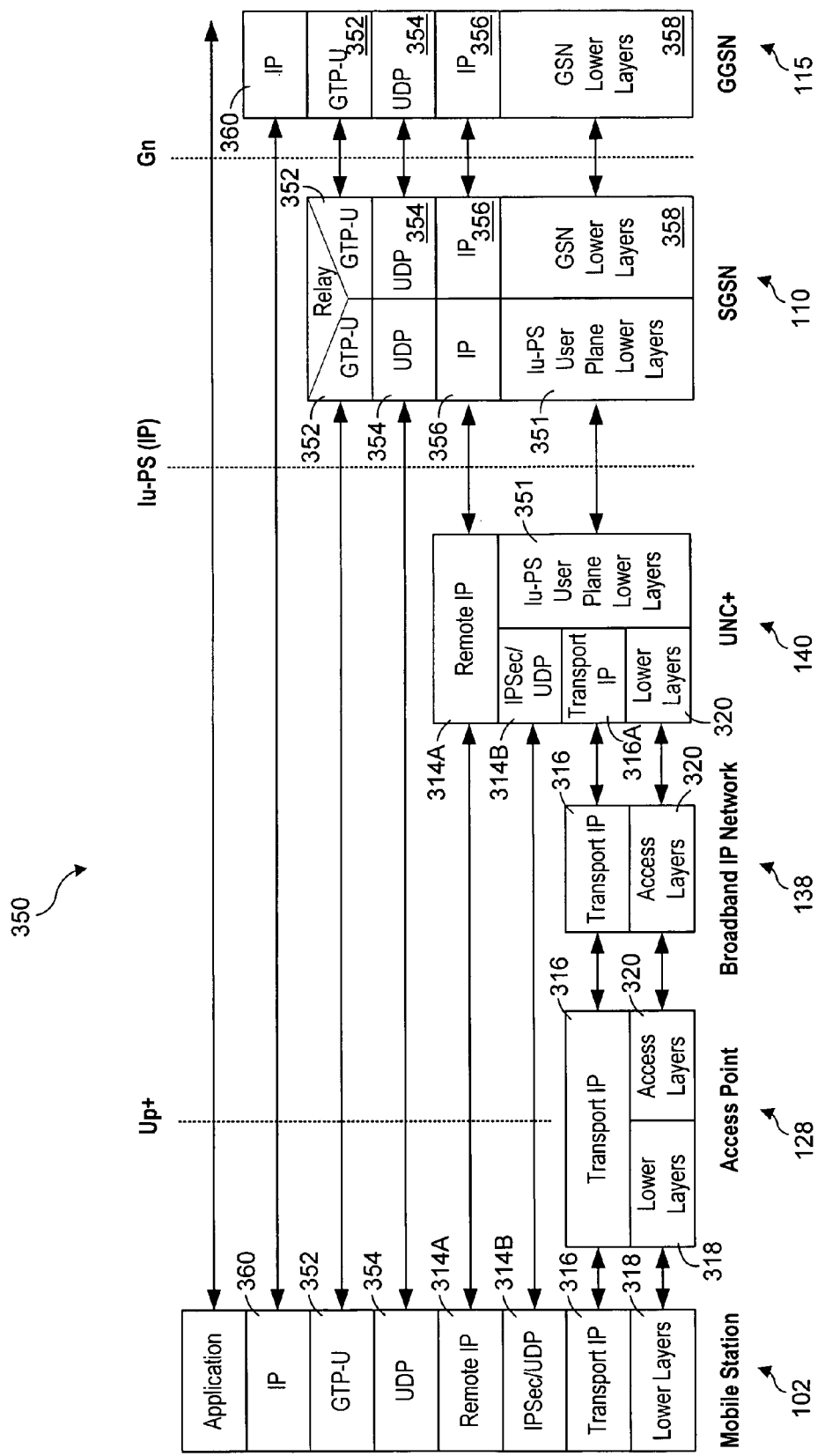
FIG. 3F illustrates a system interface protocol architecture to support data messages for PS service while inter-working with the UMTS core network, according to one embodiment.

FIG. 3F illustrates a system interface protocol architecture 350 to support data messages for PS service while interworking with UMTS core network 104. In addition to the like-named and referenced components common to the architectures of FIGS. 3F and 3D, a GGSN (Gateway GPRS Support Node) 115 that supports access to data network 116 is shown.

To facilitate communication over the Iu-PS interface, architecture 350 employs Iu-PS user plane lower layers 352 at each of UNC+ 140 and SGSN 110. These layers comprise well-known conventional Iu-PS layers, further details of which are shown in FIG. 4B.

Additional layers are provided at MS 102, SGSN 110, and GGSN 115. The Gn interface is employed for communication between SGSN 110 and GGSN 115, and may be viewed as the downlink interface of a GGSN. The Gn interface uses the GPRS tunneling protocol (GTP), which is supported by GTP-U (user) layer 352. User data packets (typically IP packets) are tunneled over GTP, which employs UDP layer 354 over IP layer 356. Each of SGSN 110 and GGSN 115 further employ GSN lower layers 358 to support communication over the Gn interface. Another IP layer 360 supports communication between MS 102 and GGSN 115. PS service over the Iu-PS interface between UNC+ 140 and SGSN 110 is facilitated, in part, by Iu-PS user plane lower layers 362, further details of which are shown in FIG. 4B.

Under architecture 350, the transport of data messages is optimized compared to both UMA/GAN and 3GPP transport mechanisms. GTP tunnels for user data transport are extended to the MS to make the transport more efficient; consequently, the data packets are relayed between the MS and SGSN directly by the SGW effectively bypassing the INC (see FIG. 6 below). When the corresponding GTP tunnel is established, the MS IP address is provided as the end point address in the downlink direction and the SGSN relays the associated downlink data packets directly to the MS via the SGW. The SGW forwards the packet to the MS utilizing the existing common UMA secure tunnel. Meanwhile, the mobile station sends the uplink data packets via remote IP layer 314A to the SGSN IP address associated with the GTP tunnel. The SGW extracts the remote IP packets and forwards them to the SGSN directly.

As noted above, the mobile station may be, for example, a wireless phone, smart phone, personal digital assistant, or mobile computer. The mobile station may also be, for example, a fixed wireless device providing a set of terminal adapter functions for connecting Integrated Services Digital Network (ISDN) or Plain Old Telephone Service (POTS) terminals to the wireless system.

Other terminal adapter types than those listed above may be employed with embodiments of the present invention. For example: (1) a terminal adapter that supports cordless telephones rather than POTS phones; (2) a terminal adapter that supports standard Session Initiation Protocol (SIP) telephones; and (3) a terminal adapter that also integrates a corded handset and user interface, such as one would find on a desk phone. In each case, the invention described herein describes how these terminal adapter functions can be connected to the wireless system via the unlicensed network.

The use of other standard Bluetooth capabilities together with embodiments of the present invention is possible. For example, there is a Bluetooth standard capability called "SIM Access Profile" that allows one Bluetooth device (e.g., an embedded cell phone subsystem in a car) to access the SIM that is in another Bluetooth device (e.g., the user's normal cell phone), allowing the first device to take on the "personality" associated with the SIM (i.e., that of the user's normal cell phone). The embodiments described above could make use of this standard capability to give the terminal adapter-attached devices (e.g., a POTS phone) the personality of the user's cell phone.

Mobility Management

The UNC+ 140 provides functions equivalent to that of a UMTS RNC, and as such controls one or more (virtual) UMA cells. In one embodiment, there may be a single UMA cell per UNC, in another embodiment there may be a single UMA cell per UTRAN registration area and, in an alternative embodiment, there may be one UMA cell per access point connected to a UNC. The latter embodiment may be less desirable due to the large number of APs expected to be used, so the UMA architecture permits flexible groupings of APs into UMA cells. Each UMA cell may be mapped to a physical boundary by associating it with specific UTRAN registration areas served by the MSC. Note that UMA cells may use the same registration area identifiers as existing UMTS cells, or a new registration area identifier may be used for UMA cells. The latter is useful in reducing paging in UMTS cells when a mobile station is known to be registered via an UNC+.

UMA CPE Addressing

Customer premise equipment (CPE) may include the mobile station and the access point (AP) through which the mobile station may access the UNC for UMA service. UMA CPE addressing parameters may include the parameters described below.

The UMA CPE addressing includes the international mobile subscriber identity (IMSI) associated with the SIM in the mobile equipment as a parameter. The IMSI is provided by the UMA mobile station to the UNC when it requests UMA service via the Up interface to the UNC. Unlike the UMTS RNC, the UNC manages a context for each mobile station that is operating in UMA mode. Therefore, the UNC maintains a record for each served mobile station. For example, IMSI may be used by the UNC to find the appropriate mobile station record when the UNC receives a RANAP mobile terminated call notification.

The UMA CPE addressing includes the address associated with the unlicensed interface in the mobile equipment (e.g., 802.11 MAC address) as a parameter. This identifier may be provided by the UMA mobile station to the UNC when it requests UMA service via the Up interface. The UNC may use this address as an alternative to the IMSI to limit the transfer of the IMSI over the Up interface and to assist in the routing of messages.

The UMA CPE addressing also includes the temporary logical link identifier (TLLI) assigned to the mobile station by the serving GPRS support node (SGSN) as a parameter. This identifier may be provided via standard Iu-PS interface procedures. The UNC may track this address for each served mobile station to support UMTS Iu-PS interface procedures (e.g., so that downlink GPRS packets may be routed to the correct mobile station).

The UMA CPE addressing also includes the access point ID (AP-ID) as a parameter. The AP-ID may be the MAC address of the unlicensed mode access point through which the mobile station is accessing UMA service. This identifier may be provided by the UMA mobile station to the UNC when it requests UMA service via the Up interface. The AP-ID may be used by the UNC to support location services (e.g., enhanced 911 service) to the user based on the AP from which the service is being accessed. The AP-ID may also be used by the service provider to restrict UMA service access only to authorized APs.

Other CPE addressing parameters that may be used depend on the security requirements of the Up interface (e.g., the need to manage UMA mobile station IP addresses for message routing via tunneled IPSec connections, or the need to manage local credentials assigned to the mobile station by the UNC).

UMA Cell Identification

In order to facilitate the mobility management functions in UMTS, the coverage area may be split into logical registration areas. Mobile stations may be required to register with the network each time the serving registration area changes. One or more registration areas identifiers may be associated with each visited location register (VLR) in a carrier's network. Likewise, one or more registration area identifiers may be controlled by a single SGSN. In one embodiment, a UMTS cell is identified within the registration area by adding a cell identity (CI) to the registration area identification.

An Example UMA Approach to Cell Identification

One example of a UMA cell identification approach is described below. In this embodiment, a single UNC provides service for one or more UMA registration areas, and each UMA registration area is distinct from, or the same as, the registration area of the overlapping UMTS cell. A UMA cell is identified within the UMA registration area by adding a cell identity (CI) to the registration area identification. The UMA cell global identification (UMA-CGI) is the concatenation of the registration area identification and the cell identity. In one embodiment, a UMA cell may be a pre-defined partition of the overall UMA coverage area identified by a UMA-CGI value. Note that cell identification, like UMA information, may be transparent to the AP, such that the AP is not aware of its associated UMA-CGI value. The UMA components (e.g., mobile station and UNC) may support the ability to partition the overall UMA coverage area.

A partitioning method may include implementing a one-to-one or a many-to-one correspondence between UMTS cell identity and UMA cell identity. Given the identification of a preferred UMTS cell in a particular area, it may be possible to determine the corresponding UMA cell identity based, for example, on UNC provisioning. An example of a one-to-one relationship is mapping a UMTS cell to a UMA cell. An example of a many-to-one relationship is mapping a UMTS registration area (and associated UMTS cells) to a UMA cell.

When a UMA mobile station connects to the UNC for UMA service, it sends the identity of the current UMTS camping cell, as well as the neighbor cells, to the UNC. The UNC maps the UMTS camping cell's identity to a corresponding UMA cell's identity based on mapping logic provisioned in the UNC. This may be a one-to-one mapping (e.g., if there is one UMA cell per UMTS cell) or a many-to-one mapping (e.g., if there is one UMA cell per UMTS registration area). If no UMTS coverage is available in the UMA service area, the UNC may assign the mobile station to a default "no licensed coverage" UMA cell. A single UNC may serve one MSC. This does not preclude UNC embodiments that combine multiple UNC "instances," as defined above, in a single device (for example, a UNC that servers multiple MSCs). Each UNC may also be assigned a unique "UMA-Handover-CGI" value used for UMTS-to-UMA handover purposes. For example, this may be the value provisioned in the UTRAN RNC's cell-to-RNC tables and in the MSCs (e.g., to point to the UNC).

UMA Registration and Deregistration

In one embodiment, as described above, a UMA registration process does not employ signaling to the PLMN infrastructure and is contained within the UMA system (i.e., the mobile station sends a UMA registration request message to the UNC and the UNC responds with registration accept and provide certain operating parameters to the MS). The UMA registration process may serve at least two purposes. It may inform the UNC that a mobile station is connected through a particular AP and is available at a particular IP address. The UNC may keep track of this information, for example, for mobile-terminated calling. The registration process may also provide the mobile station with the operating parameters associated with the UMA service on the AP. This may be analogous to the use of the UMTS broadcast control channel (BCCH) to transmit system parameters to mobile stations in UMTS cells. UMTS system information message content that is applicable in UMA mode may be delivered to the mobile station during the UMA registration process.

Similarly, a UMA deregistration process may allow the mobile station to explicitly inform the UNC that it is leaving UMA mode, allowing the UNC to free resources that it may have assigned to the mobile station. The UNC may also support implicit UMA deregistration, wherein a secure channel to the mobile station is abruptly terminated.

UMA Redirection

In one embodiment, as described above, when a UMA mobile station connects to the UNC for UMA service, it may send a cell identity value and a signal quality measurement of the current UMTS camping cell, as well as the neighbor cells, to the UNC. Using this information, as well as internal database information, the UNC may be able to determine if it is the correct serving UNC for the mobile station, and if it is not the correct serving UNC, to redirect the mobile station to the correct UNC. The correct serving UNC may be the UNC whose UMA service area overlaps the mobile station's umbrella UMTS coverage. In one embodiment, the correct serving UNC might be attached to the same MSC as the UMTS RNC to which the umbrella UMTS cell belongs. In an alternative embodiment, the correct serving UNC might be attached to a different MSC that may hand-over to the MSC that provides umbrella UMTS coverage to the mobile station, allowing the UNC to handover calls to and from UMTS. It may also enable certain location-based services (e.g., E911 Phase 1) that can be tied to the location of the UMTS cell. An internal database used by the UNC may map UMTS registration areas to serving UNCs and conserve the amount of data that needs to be managed. This database may only need to change when a new UNC or a new UMTS registration area is added.

If no UMTS coverage is available when a mobile station connects to the UNC for UMA service, then, under some instances, the UNC may not reliably determine the location of the mobile station for the purposes of assigning the mobile station to the correct serving UNC (e.g., to enable handover and location-based services). The UNC may permit the operator to determine the service policy in this case (e.g., the operator may provide service to the user with certain limitations, possibly with a user interface indication on the mobile station).

UMA Mobile Station Idle Mode Behavior

Figure 5:
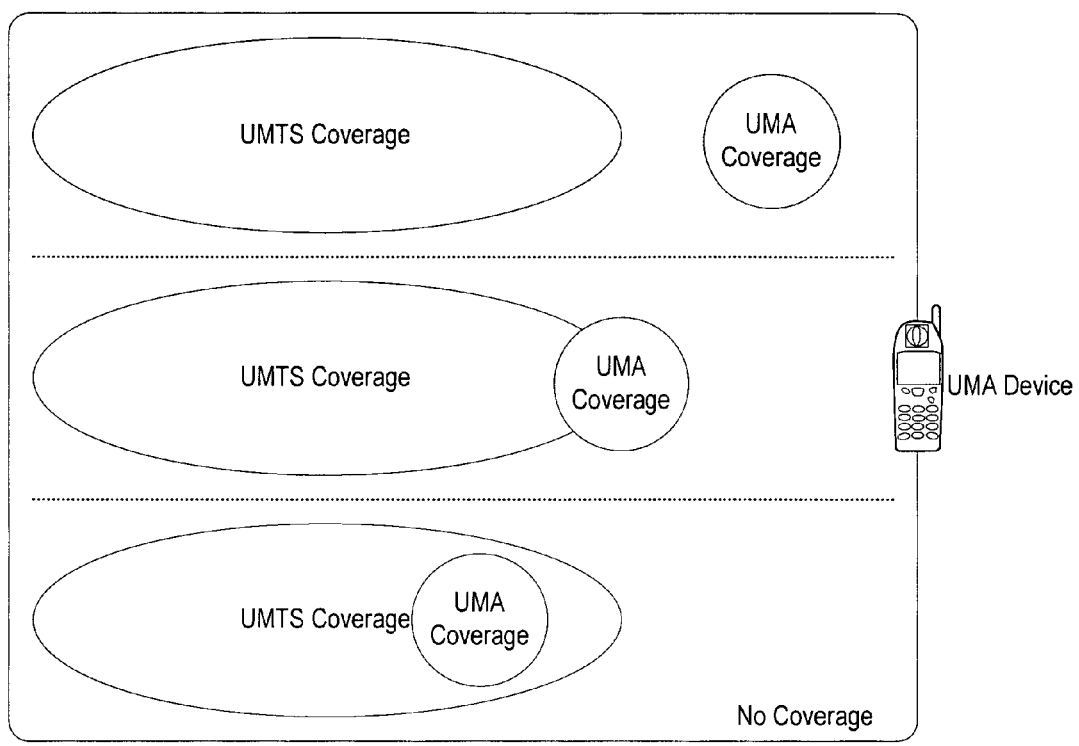
FIG. 5 illustrates several possible UMTS and UMA coverage scenarios in accordance with one embodiment.

As described above, a UMA device may encounter different radio environments, such as illustrated in FIG. 5. In a first environment, the UMTS and UMA coverage areas are completely separate and non-overlapping. In a second environment, the UMTS and UMA coverage is partially overlapping. In a third environment, which may be the most common, the UMA coverage is encapsulated within the UMTS coverage. A UMA device may power on in any of these environments and further may transition in a number of attached states.

At power on, and when the mobile station is idle and there is no coverage of any type, the mobile station may scan for both UMTS and UMA radio coverage. If UMTS coverage is detected, then the normal UMTS mobility management procedure may be initiated. This condition may apply when no UMA coverage has been detected by the mobile station when UMTS coverage is detected, or prior to the completion of the UMA registration process. If UMA coverage is detected, then the UMA mobile station establishes an unlicensed wireless link (e.g., WLAN link) to the AP and monitors signal quality. When the received signal level at the mobile station passes a predefined threshold, the mobile station performs the UMA registration procedure. Based upon the information returned, the mobile station may determine if a full network registration is required, and if so, what type (e.g., UMTS). This procedure may apply when no UMTS coverage exists or when UMA coverage is detected prior to detecting UMTS coverage.

When the mobile station is idle in UMTS coverage, and there is no UMA coverage, the mobile station may periodically scan for UMA coverage. If UMA coverage is detected, the mobile station may initiate the UMA registration procedure described above.

When the mobile station is idle in UMA coverage and there is no UMTS coverage, the mobile station may continue to perform normal UMTS PLMN search procedures. If UMTS coverage is detected, the mobile station may send the UMTS cell information to the UNC for possible UMA redirection purposes as described above. Alternatively, the mobile station may disable normal UMTS PLMN search procedures to conserve power.

When the mobile station is idle in UMA coverage, and there is UMTS coverage, the mobile station may continue to perform normal UMTS cell reselection procedures and may store the identification of the selected UMTS cell to speed the transition to UMTS mode, if required. Alternatively, the mobile station may disable normal UMTS cell reselection procedures to conserve power.

At power off in UMA coverage, a detach indication may be sent by the mobile station to the PLMN via the UMAN (e.g., if required by the PLMN network or normally sent by the mobile station at power off). This indication may be encoded per the current UMTS mode of operation.

The UMA environment may be an IEEE 802.11 environment. In this case, the mobile station periodically performs an active scan for available 802.11 APs. When an AP is discovered, it may be matched against a stored profile of user preferences and security credentials, in which case the mobile station may automatically associate with the AP. The mobile station may enter low-power sleep mode, waking up periodically to measure signal quality for determining when to trigger UMA registration.

The UMA environment may be a Bluetooth environment. In this case, the mobile station previously paired with the Bluetooth AP through which it will access UMA service. Periodically, the mobile station may enter a page scan receive mode, and respond to an AP transmit page to establish a link-level connection. Once a link-level control channel is established, and if the mobile station is not otherwise active, it may enter a low-power Bluetooth state (e.g., park mode) to conserve power. Periodically, the AP may poll the mobile station to allow it to re-enter active-power mode. This periodic traffic may also be used by the mobile station to measure signal quality to determine when to perform the UMA registration procedure.

UMA Mobile Station Dedicated Mode Behavior

A UMA device engaged in a voice call, a data transaction or a simultaneous voice/data transaction may encounter a transition from UMTS coverage to UMA coverage or a transition from UMA coverage to UMTS coverage. In one embodiment, when the coverage transitions from UMTS to UMA coverage, calls may be handed over transparently between the UTRAN and the UMAN. In the case of voice, the handover may be accomplished by a handover function. In the case of data, session management controls may provide a common end-user experience to that provided in GPRS. Normal registration actions may occur upon a return to the idle state, if appropriate. When the coverage transitions from UMA to UMTS coverage, calls may be handed over transparently between the UMAN and the UTRAN. In the case of voice, the handover may be accomplished by a handover function. In the case of data, session management controls may provide a common end-user experience to that provided in GPRS.

UNC Architecture

Figure 6:
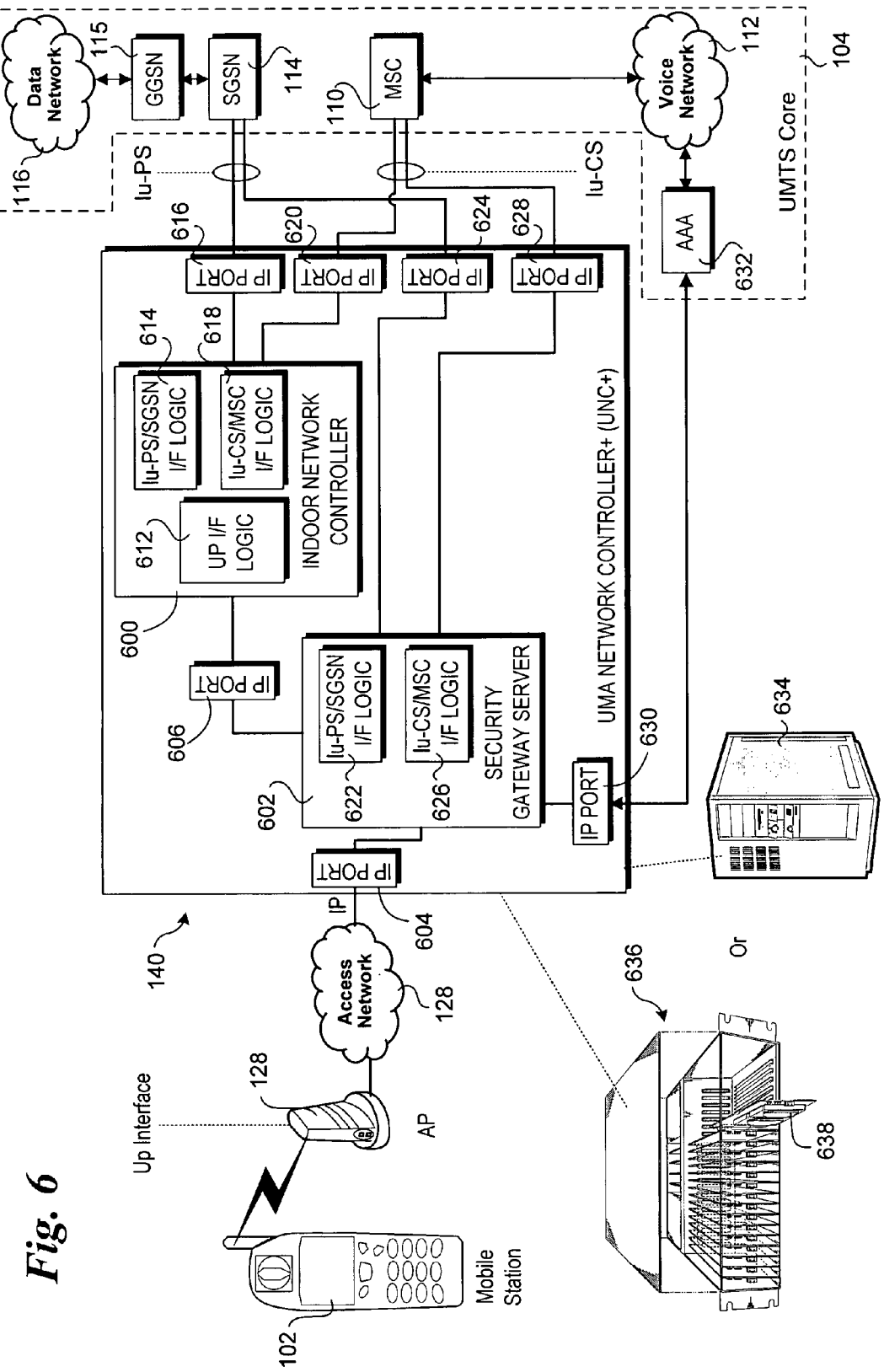
FIG. 6 is a schematic block diagram illustrating one embodiment of a high-level architecture of a UNC.

A block diagram illustrating a high-level architecture corresponding to one embodiment of a UNC+ is shown in FIG. 6. At the heart of the UNC architecture is an indoor network controller (INC) 600. In general, the INC performs operations synonymous to those described above for the UNC/UNC+. However, as shown in the illustrated UNC+ architecture, an integrated security gateway (SGW) server 602 is further provided. Accordingly, each of these elements is shown as a separate element that is employed to facilitate various aspects of the UNC operations described herein.

In general, the UNC+ may provide one or more communication ports to support communications between mobile stations and the UNC+ (e.g., via an AP 128 and broadband IP network 138 as shown in FIG. 1A). For example, in the illustrated embodiment of FIG. 6, security gateway server 602 is coupled to IP network 138 via an IP port 604. In addition, an IP port 608 is used to connect INC 600 to the SGW server.

The SGW server 602 performs security and authentication services. It may be an integrated unit (as shown), or may be a separate (physical) unit connected to the UNC+ via an appropriate communication link.

The INC 600 includes resources to support (i.e., generate and process) the UP+ interface messages described herein. These resources are depicted as UP+ Interface (I/F) logic 612. Similarly, INC 600 includes Iu-PS/SGSN interface logic 614 to support communications with SGSN 114 via an IP (or ATM) port 616 using the Iu-PS interface, and IuCS/MSC interface logic 618 to support communication with MSC 110 via an IP (or ATM) port 620 using the Iu-CS interface.

Meanwhile, SGW server 602 includes Iu-PS/SGSN interface logic 622 to support communication with SGSN 114 via an IP port 624 using the Iu-PS interface and Iu-CS/MSC interface logic 626 to support communication with MSC 110 via a port 628 using the Iu-CS interface. SGW server 602 also is able to communicate directly with voice network 112 via an IP port 630 and an AAA (authentication, authorization, and accounting) server 632. AAA server 632 employs an IP security mechanism for authentication/authorization, such as the Remote Authentication Dial-In User Service (RADIUS) or the Diameter protocol.

Each of UP interface logic 612, Iu-PS/SGSN interface logic 614 and 622, and Iu-CS/MSC interface logic 618 and 626 may be implemented via execution of software, built-in programmed hardware, or a combination of the two. For example, UP interface logic 612 may be facilitated by executing one or more software modules on a processor, wherein the software modules are coded to generate and/or process URR+ and URLC+ messages.

In general, a UNC may be implemented by a single server, multiple distributed servers, and multiple clustered servers. For example, a single server 634 may be employed for running various software applications to provide the various functions shown in the block diagram of the UNC+ architecture of FIG. 6. Optionally, some of the functions, such as the SGW server functions, may be provided by a separate server or servers. In yet another configuration, a blade server 636 is employed. The blade server includes multiple server blades 638 that are installed in a common rack or chassis, with each server blade functioning as a separate server, each with its own processor(s), memory, and network interfaces. In one embodiment, the functions provided by each of the security gateway server 602 and INC 600 are facilitated via execution of software applications and/or modules on respective server blades 638.

Mobile Station Architectures

Figure 7:
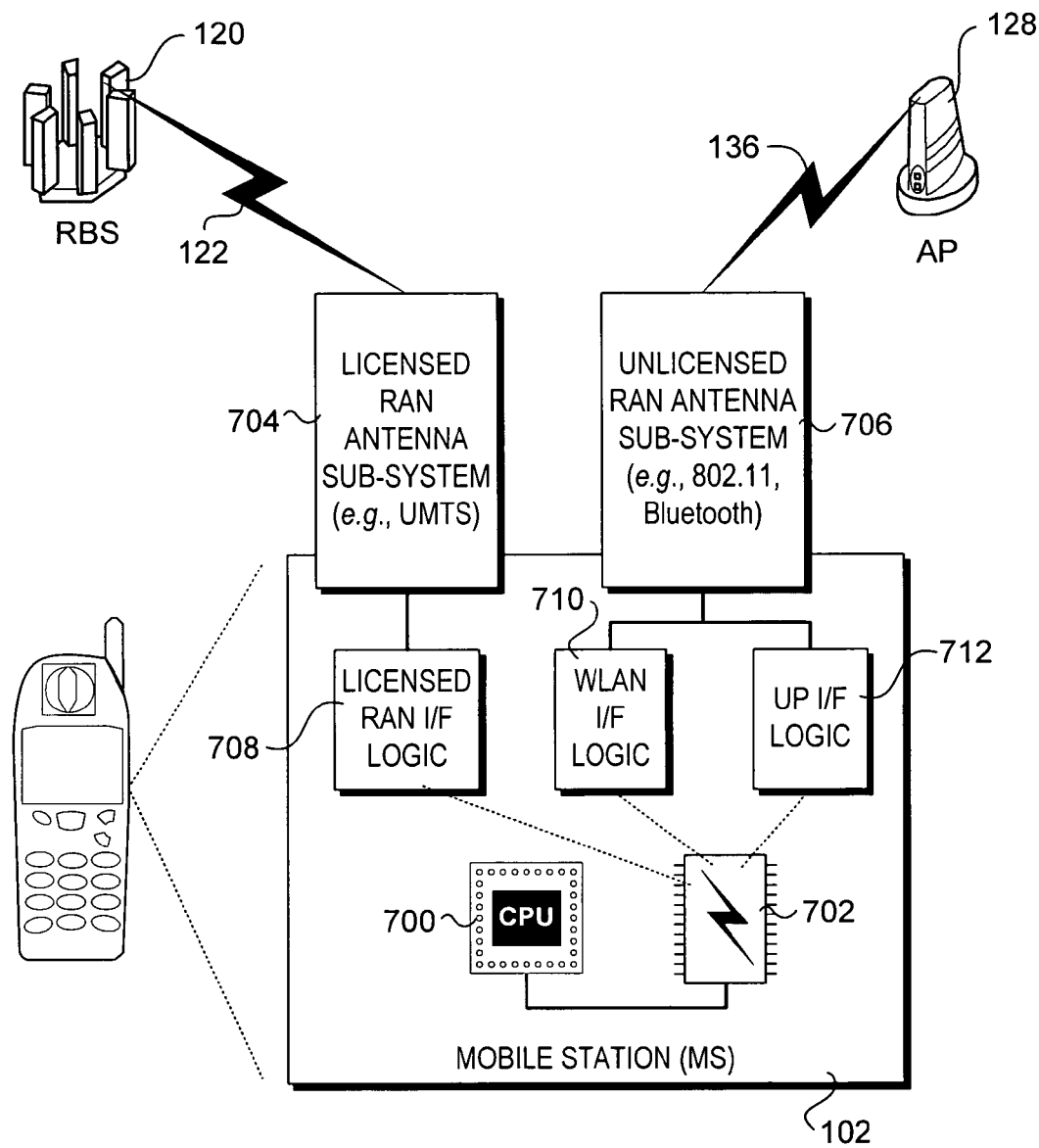
FIG. 7 is a schematic block diagram illustrating one embodiment of a high-level architecture of a mobile station.

FIG. 7 shows a block diagram illustrating a high-level architecture for one embodiment of a mobile station. The architecture includes a processor 700 coupled to a non-volatile memory 702, a licensed RAN antenna sub-system 704 and an unlicensed RAN antenna sub-system 706. Non-volatile memory 702 is used to store software/firmware instructions for performing various functions and operations described herein. These functions and operations are depicted licensed RAN interface logic 708, WLAN interface logic 710, and Up interface logic 712.

Licensed RAN antenna sub-system 704 and licensed RAN interface logic 708 are employed to facilitate conventional licensed RAN operations. For example, in one embodiment the licensed RAN comprises a UMTS network, and thus these components facilitate normal UMTS network operations typically employed by UMTS-based cellular devices and the like, which are well-known in the cellular communication art. Meanwhile, the unlicensed RAN antenna system 606 and WLAN interface logic 610 are used to support an unlicensed wireless channel (i.e., link) 136 with an access point 128 via which UMAN services may be accessed. In general, these blocks represent conventional components and logic employed to support communications over an unlicensed WLAN link. For example, these components are illustrative of components that may be employed to implement the Bluetooth lower layers shown in FIG. 3B for a Bluetooth link, or the 802.11 lower layers shown in FIG. 3C for an 802.11 link.

Up interface logic 712 is used to provide the MS-side Up interface functions and operations described herein. This includes generating and processing various URR messages, as well as providing the various UP interface layers depicted in FIGS. 3A and 3D-F.

Figure 8:
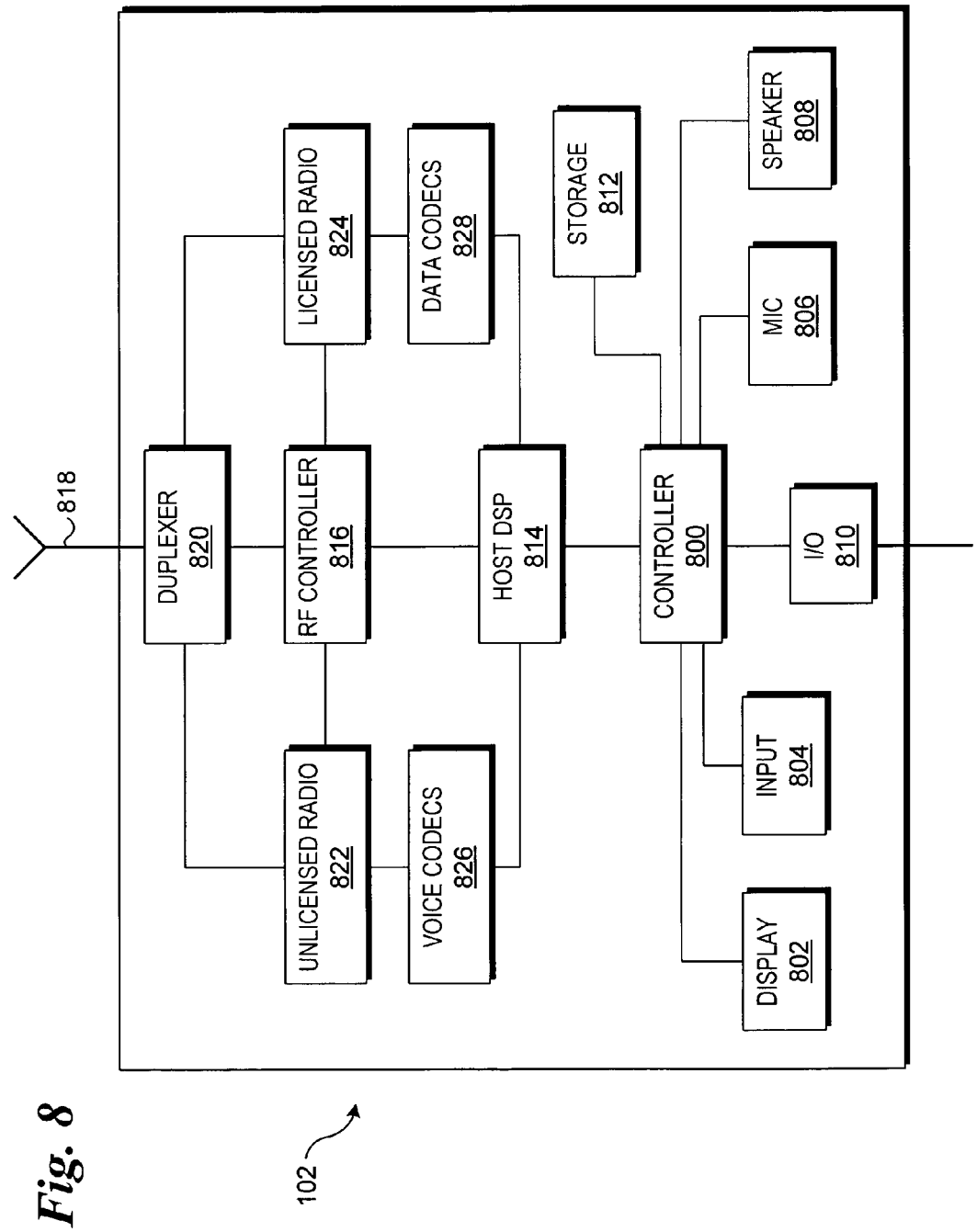
FIG. 8 is a block diagram illustrating a hardware architecture of a mobile station, according to one embodiment.

FIG. 8 shows a block-level hardware architecture corresponding to an MS 102 that may be used according to some embodiments of the present invention. The MS of FIG. 8 may be in a form that resembles a dual mode cellular telephone, a cordless telephone, a PDA, a portable computer or a communications card in a larger computer. The functions of the MS are managed by a controller 800 that is coupled to a display 802, a user input device 804, a microphone 806 and a speaker 808. While these components are shown as incorporated into the MS, as may be done for example in a dual mode portable telephone, one or more of the components may be external. The microphone and speaker may be in an external wired or wireless headset or handset, the input device may be an external pointing device or keyboard, and the display may be a standalone monitor. External components may be wired to the device or wirelessly attached, as with a WLAN or Bluetooth radio connection. Any one or more of the illustrated user interface components may be removed for particular applications.

The controller may also be coupled to one or more other I/O (Input/Output) devices 810. Typical I/O devices include a synchronization port, an accessory port, a wired network interface, a docking port, and a port replicator that permits further external devices to be attached or an interface to a base station. If the MS is adapted for use as a component of a larger computer system, then the display, input, microphone or speaker may be removed in favor of a bus interface. The bus interface may comprise a PC cardbus, PCI (Peripheral Component Interconnect) bus, a USB (Universal Serial Bus), IDE (Integrated Device Electronics), ATA (Advanced Technology Attachment) or other type of bus. The bus interface may be combined with a display 802, such as status LEDs (Light Emitting Diodes) and a speaker 808.

The controller 800 is further coupled to one or more storage devices 812 such as RAM (Random Access Memory), ROM (Read Only Memory), flash memory, a disk drive and an optical drive. The storage may be used to store operating instructions, applications, and data that is communicated with an enterprise and public domains. The controller is also coupled to a host DSP (Digital Signal Processor) 814. The host DSP communicates data with the controller that is to be carried by the radios. The data may represent voice, text, graphics, applications, etc. The host DSP 814 controls the flow of the data to and from the radio and controls the radios themselves through an RF controller 816. The RF controller controls timing, frequencies, and other aspects of the radios.

The MS of FIG. 8 shows two radio paths from a single antenna 818. More radio paths may be used and, if the radio systems are sufficiently similar, then different radio interfaces may be carried by a single path. The antenna is coupled to a duplexer 820 controlled by RF controller 816 that routes signals from the appropriate system to the appropriate radio. The duplexer may be a passive frequency multiplexer and demultiplexer or it may be an active device. The duplexer is coupled to an unlicensed band radio 822 capable of communicating using an unlicensed radio frequency and to a licensed band radio 824 capable of communicating using a licensed radio frequency.

The radios 822, 824, controlled by RF controller 816, may contain amplifiers, frequency converters, multiplexers, demultiplexers, equalizers, analog and digital converters, encoders and decoders, splitters and combiners, spreaders, despreaders and other elements. The radios are operatively coupled to voice and data codecs 826, 826 which are, in turn, coupled to the host DSP. Data or voice received from the antenna propagates through the duplexer to the appropriate radio, through the codec, to the host DSP and then to the controller for display, output, play or storage. Data or voice to be transmitted follows the opposite path from the controller through the DSP to the appropriate codecs and radio, through the duplexer and the antenna. The particular type of radio and transmission and reception chain may be adapted to suit different applications. More or less components than those shown in FIG. 8 may be used in a MS. The transmit and receive chains may be combined, as shown or separated.

The means for facilitating various message generation and processing operations, as well as various aspects of the Up, Iu-CS, and Iu-PS interfaces may include execution of software/firmware instructions on an appropriate processing element, such as, but not limited to, a processor, multiple processors, a multi-core processor, a DSP, a microcontroller, etc. Thus, embodiments of this invention may be used as or to support instructions executed upon some form of processing core or otherwise implemented or realized upon or within a machine-readable medium. A machine-readable medium includes any mechanism for storing or transmitting information in a form readable by a machine (e.g., a computer). For example, a machine-readable medium can include a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.). For example, in one contemplated implementation, instructions embodied as software upgrades for facilitating UMA messaging may be downloaded to a mobile device via a wireless link, such as a UMAN or UMTS link.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

APPENDIX I

Table Of Acronyms

| | |
|---|---|
| AP | Access Point |
| ARFCN | Absolute RF Channel Number |
| ATM | Asynchronous Transfer Mode |
| ATM VC | ATM Virtual Circuit |
| BA | BCCH Allocation |
| BAS | Broadband Access System |
| BB | Broadband |
| BCCH | Broadcast Common Control Channel |
| BRAS | Broadband Remote Access System |
| BSC | Base Station Controller |
| BSS | Base Station Subsystem |
| BSSGP | Base Station System GPRS Protocol |
| BSSMAP | Base Station System Management Application Part |
| BTS | Base Transceiver Station |
| CDMA | Code Division Multiple Access |
| CGI | Cell Global Identification |
| CIC | Circuit Identity Code |
| CLIP | Calling Line Presentation |
| CM | Connection Management |
| CPE | Customer Premises Equipment |
| CS | Circuit Switched |
| CVSD | Continuos Variable Slope Delta modulation |
| DSL | Digital Subscriber Line |
| DSLAM | DSL Access Multiplexer |
| DTAP | Direct Transfer Application Part |
| ETSI | European Telecommunications Standards Institute |
| FCAPS | Fault-management, Configuration, Accounting, Performance, and Security |
| FCC | US Federal Communications Commission |
| GERAN | GSM Edge Radio Access Network |
| GGSN | Gateway GPRS Support Node |
| GMM/SM | GPRS Mobility Management and Session Management |
| GMSC | Gateway MSC |
| GSM | Global System for Mobile Communication |
| GPRS | General Packet Radio Service |
| GSN | GPRS Support Node |

APPENDIX I-continued

Table Of Acronyms

| Acronym | Definition |
|---|---|
| GTP | GPRS Tunnelling Protocol |
| HLR | Home Location Register |
| IAN | Indoor Access Network (see also UMA Cell) |
| IAN-RR | Indoor Access Network Radio Resource Management |
| IBS | Indoor Base Station. |
| IBSAP | IBS Application Protocol |
| IBSMAP | IBS Management Application Protocol |
| IEP | IAN Encapsulation Protocol |
| IETF | Internet Engineering Task Force |
| IMEI | International Mobile Station Equipment Identity |
| IMSI | International Mobile Subscriber Identity |
| INC | Indoor Network Controller |
| INC | Indoor Network Controller |
| IP | Internet Protocol |
| ISDN | Integrated Services Digital Network |
| ISP | Internet Service Provider |
| ISP IP | Internet Service Provider's IP |
| IST | IAN Secure Tunnel |
| ISUP | ISDN User Part |
| ITP | IAN Transfer Protocol |
| LA | Location Area |
| LAI | Location Area Identification |
| LLC | Logical Link Control |
| MAC | Medium Access Control |
| MAP | Mobile Application Part |
| MDN | Mobile Directory Number |
| MG | Media Gateway |
| MM | Mobility Management |
| MM | Mobility Management |
| MS | Mobile Station |
| MSC | Mobile Switching Center |
| MSISDN | Mobile Station International ISDN Number |
| MSRN | Mobile Station Roaming Number |
| MTP1 | Message Transfer Part Layer 1 |
| MTP2 | Message Transfer Part Layer 2 |
| MTP3 | Message Transfer Part Layer 3 |
| NAPT | Network Address and Port Translation |
| NAT | Network Address Translation |
| NS | Network Service |
| PCM | Pulse Code Modulation |
| PCS | Personal Communication Services |
| PCS | Personal Communications Services |
| PLMN | Public Land Mobile Network |
| POTS | Plain Old Telephone Service |
| PPP | Point-to-Point Protocol |
| PPPoE | PPP over Ethernet protocol |
| PSTN | Public Switched Telephone Network |
| P-TMSI | Packet Temporary Mobile Subscriber Identity |
| QoS | Quality of Service |
| RA | Routing Area |
| RAC | Routing Area Code |
| RAI | Routing Area Identification |
| RAI | Routing Area Identity |
| RAN | Radio Access Network |
| RF | Radio Frequency |
| RFC | Request for Comment (IETF Standard) |
| RLC | Radio Link Control |
| RR | Radio Resource Management |
| RTCP | Real Time Control Protocol |
| RTCP | Real Time Control Protocol |
| RTP | Real Time Protocol |
| RTP | Real Time Protocol |
| SAP | Service Access Point |
| SCCP | Signaling Connection Control Part |
| SCO | Synchronous Connection-Oriented |
| SDCCH | Standalone Dedicated Control Channel |
| SGSN | Serving GPRS Support Node |
| SMC | Short Message Service Centre |
| SMS | Short Message Service |
| SM-SC | Short Message Service Centre |
| SMS-GMSC | Short Message Service Gateway MSC |
| SMS-IWMSC | Short Message Service Interworking MSC |
| SNDCP | SubNetwork Dependent Convergence Protocol |
| SS | Supplementary Service |
| SSL | Secure Sockets Layer |
| TCAP | Transaction Capabilities Application Part |
| TCP | Transmission Control Protocol |
| TCP | Transmission Control Protocol |
| TLLI | Temporary Logical Link Identity |
| TMSI | Temporary Mobile Subscriber Identity |
| TRAU | Transcoder and Rate Adaptation Unit |
| TTY | Text telephone or teletypewriter |
| UDP | User Datagram Protocol |
| UMA Cell | Unlicensed Mobile Access Cell (see also IAN) |
| UMTS | Universal Mobile Telecommunication System |
| UNC | UMA Network Controller (see also INC) |
| VLR | Visited Location Register |
| VMSC | Visited MSC |
| WLAN | Wireless Local Area Network |
| WSP IP | Wireless Service Provider's IP Network |

What is claimed is:

1. An unlicensed network controller (UNC) to operate in an unlicensed wireless communication system comprising a first radio access network, the UNC comprising:
    a first network interface comprising an Internet Protocol (IP) network interface;
    a second network interface comprising a Up interface for communicating messages with a mobile station (MS) via an access point communicatively coupled between the UNC and the MS, the Up interface including a plurality of protocol layers implemented over the IP network interface;
    a third network interface for connecting the UNC to a (Universal Mobile Telecommunications System (UMTS) core network that is accessible to a second radio access network comprising a UMTS Terrestrial Radio Access Network (UTRAN), the third network interface comprising an Iu-PS (packet-switched) interface to communicate with a Serving General Packet Radio Service (GPRS) Support Node (SGSN) in the UMTS core network, the third network interface supporting signaling protocols for packet-switched service while inter-working with the UMTS core network via the Iu-PS interface using a layered protocol that includes a Radio Access Node Application Part (RANAP) layer over a Signaling Connection Control Part (SCCP) layer and a plurality of Iu-PS control plane lower layers; and
    one or more processing units for generating and/or processing a plurality of messages transmitted over the third network interface between the UNC and the UMTS core network, wherein the UNC appears to the UMTS core network as a UTRAN Radio Network Controller (RNC).

2. The UNC of claim 1, wherein the third network interface includes an Iu-CS (circuit-switched) interface to communicate with a Mobile Switching Center (MSC) in the UMTS core network.

3. The UNC of claim 2, wherein the third network interface supports signaling protocols for circuit-switched service while inter-working with the UMTS core network via the Iu-CS interface using a layered protocol that includes a RANAP layer over an SCCP layer and a plurality of Iu-CS control plane lower layers.

4. The UNC of claim 2, wherein the third network interface supports a CS user plane transport while inter-working with the UMTS core network via the Iu-CS interface using a layered protocol that includes a remote IP (Internet Protocol) layer over a plurality of Iu-CS user plane lower layers.

5. The UNC of claim 1, wherein the third network interface further supports data messages for packet-switched service while inter-working with the UMTS core network via the Iu-PS interface using a layered protocol that includes a remote IP (Internet Protocol) layer over a plurality of Iu-PS user plane lower layers.

6. The UNC of claim 1 further comprising a security gateway (SGW) server, wherein the SGW server comprises (i) a first network interface for connecting to the first radio access network and (II) a second network interface for connecting the SGW server to the UMTS core network.

7. The UNC of claim 6, wherein the SGW server further comprises a third network interface for connecting the SGW to an AAA (Authentication, Authorization, and Accounting) server in the UMTS core network.

8. The UNC of claim 6, wherein the second network interface of the SGW server includes an Iu-CS interface.

9. The UNC of claim 6, wherein the second network interface of the SGW server includes the Iu-PS interface.

10. An apparatus comprising:
a mobile station operable to communicate with a Universal Mobile Telecommunications System (UMTS) telecommunications network using a licensed wireless communication channel serviced by a UMTS Terrestrial Radio Access Network (UTRAN) and an unlicensed wireless communication channel in an unlicensed wireless access area,
wherein the mobile station is (i) associated with a licensed wireless network identifier and a licensed wireless location identifier when the mobile station is in a licensed wireless access area and (ii) associated with an unlicensed wireless network identifier and an unlicensed wireless location identifier when the mobile station is in the unlicensed wireless access area,
wherein the mobile station employs a plurality of protocol layers to access an unlicensed wireless service and a UMTS core network, the protocol layers being used to support communication with an unlicensed wireless network controller over a Up interface and the UMTS core network via an Iu-CS interface,
wherein the mobile station supports signaling protocols for circuit-switched service while inter-working with the UMTS core network via the Iu-CS interface using a layered protocol, the layered protocol including a Connection Management (CM) layer, a Mobility Management (MM) layer, a UMA Radio Resource (UMA-RR) layer, and a transmission control protocol (TCP) layer, and
wherein the layered protocol further includes a Remote Internet Protocol (Remote IP) layer, a security protocol layer, a transport IP layer, and a plurality of lower layers.

11. The apparatus of claim 10, wherein the unlicensed wireless access area comprises an IEEE 802.11 wireless local area network (WLAN).

12. The apparatus of claim 10, wherein the unlicensed wireless access area comprises a Bluetooth personal local area network (PLAN).

13. The apparatus of claim 10, wherein the mobile station supports a CS user plane transport while inter-working with the UMTS core network via the Iu-CS interface using a layered protocol, the layered protocol including an Adaptive Multi-Rate (AMR) codecs layer, and an RTP/UDP layer.

14. The apparatus of claim 13, wherein the layered protocol further includes a remote IP layer, a security layer, a transport IP layer, and a plurality of unlicensed lower layers.

15. The apparatus of claim 10, wherein the protocol layers further include layers to support communication with the UMTS core network via an Iu-PS interface.

16. The apparatus of claim 15, wherein the mobile station supports signaling protocols for packet-switched service while inter-working with the UMTS core network via the Iu-PS interface using a layered protocol, the layered protocol including a GPRS mobility management)/(Session Management)/Short Message Service (GMM/SM/SMS) layer, a UMA Radio Resource (UMA-RR) layer, and a TCP layer.

17. The apparatus of claim 16, wherein the layered protocol further includes a remote IP layer, a security layer, a transport IP layer, and a plurality of unlicensed lower layers.

18. The apparatus of claim 15, wherein the mobile station supports data messages for packet-switched service while inter-working with the UMTS core network via the Iu-PS interface using a layered protocol, the layered protocol including an IP layer, a GPRS (General Packet Radio Service) tunneling protocol-User (GTP-U) layer, and a UDP layer.

19. The apparatus of claim 18, wherein the layered protocol further includes a remote IP layer, a security layer, a transport IP layer, and a plurality of unlicensed lower layers.

* * * * *